United States Patent [19]

Philpot et al.

[11] Patent Number: 4,934,165
[45] Date of Patent: Jun. 19, 1990

[54] COMPUTER CONTROLLED COILING MACHINE

[75] Inventors: Russell Philpot, Boxborough; Timothy Hallihan, Charlton Depot, both of Mass.

[73] Assignee: Sleeper & Hartley Corp., Worcester, Mass.

[21] Appl. No.: 258,797

[22] Filed: Oct. 17, 1988

[51] Int. Cl.⁵ .......................... B21F 3/04; B21F 11/00
[52] U.S. Cl. ............................................ 72/12; 72/23; 72/132; 72/138
[58] Field of Search .................... 72/10, 11, 12, 21, 22, 72/23, 131, 132, 135, 137, 138

[56] References Cited

U.S. PATENT DOCUMENTS

| | | | |
|---|---|---|---|
| 3,192,748 | 7/1965 | Lange | 72/137 X |
| 3,576,120 | 4/1971 | LeVasseur | 72/138 X |
| 3,906,766 | 9/1975 | Sato | 72/138 X |
| 4,026,135 | 5/1977 | Yagusic et al. | 72/135 X |
| 4,112,721 | 9/1978 | Takase et al. | 72/138 X |
| 4,236,397 | 12/1980 | Lange | 72/137 |
| 4,372,141 | 2/1983 | Russell et al. | 72/131 |
| 4,402,204 | 9/1983 | Russell et al. | 72/131 |
| 4,416,135 | 11/1983 | Russell | 72/130 |
| 4,524,597 | 6/1985 | Russell et al. | 72/135 |
| 4,528,831 | 7/1985 | Russell et al. | 72/131 |
| 4,607,513 | 8/1986 | Russell | 72/137 |
| 4,672,549 | 6/1987 | Saxton | 72/138 X |
| 4,699,289 | 6/1987 | Itaya | 72/23 |

FOREIGN PATENT DOCUMENTS 2023040 6/1979 United Kingdom .
2063123 10/1980 United Kingdom .

Primary Examiner—E. Michael Combs
Attorney, Agent, or Firm—Wolf, Greenfield & Sacks

[57] ABSTRACT

A system for controllng the feeding of wire to a workstation for the formation of a coil spring by means of at least one moveable work tool that is disposed at the workstation and that is selectively operated to move to different positions in the formation of a particular spring. The system includes a feed mechanism for feeding wire to the workstation and computer control means for controlling the feed mechanism to optimize the rate of spring making. The computer control means includes an entry means for setting predetermined characteristics regarding wire feed and work tool motion in constructing the particular spring. Work tool motion intervals are defined and the velocity of wire feed is maintained in a predetermined velocity range during the work tool motion interval, increasing in the velocity feed to a velocity greater than the predetermined velocity range outside of this work tool motion interval.

12 Claims, 18 Drawing Sheets

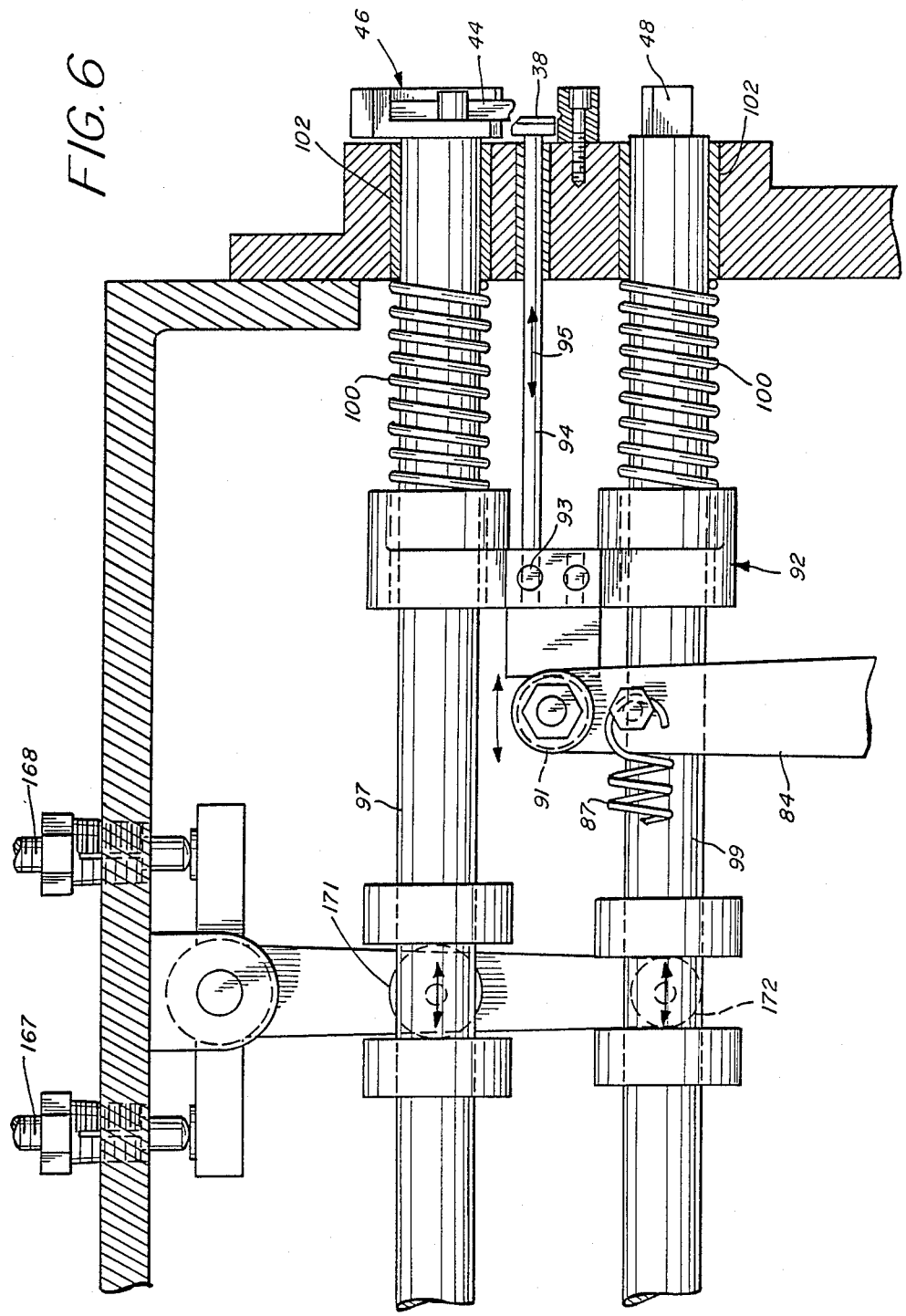

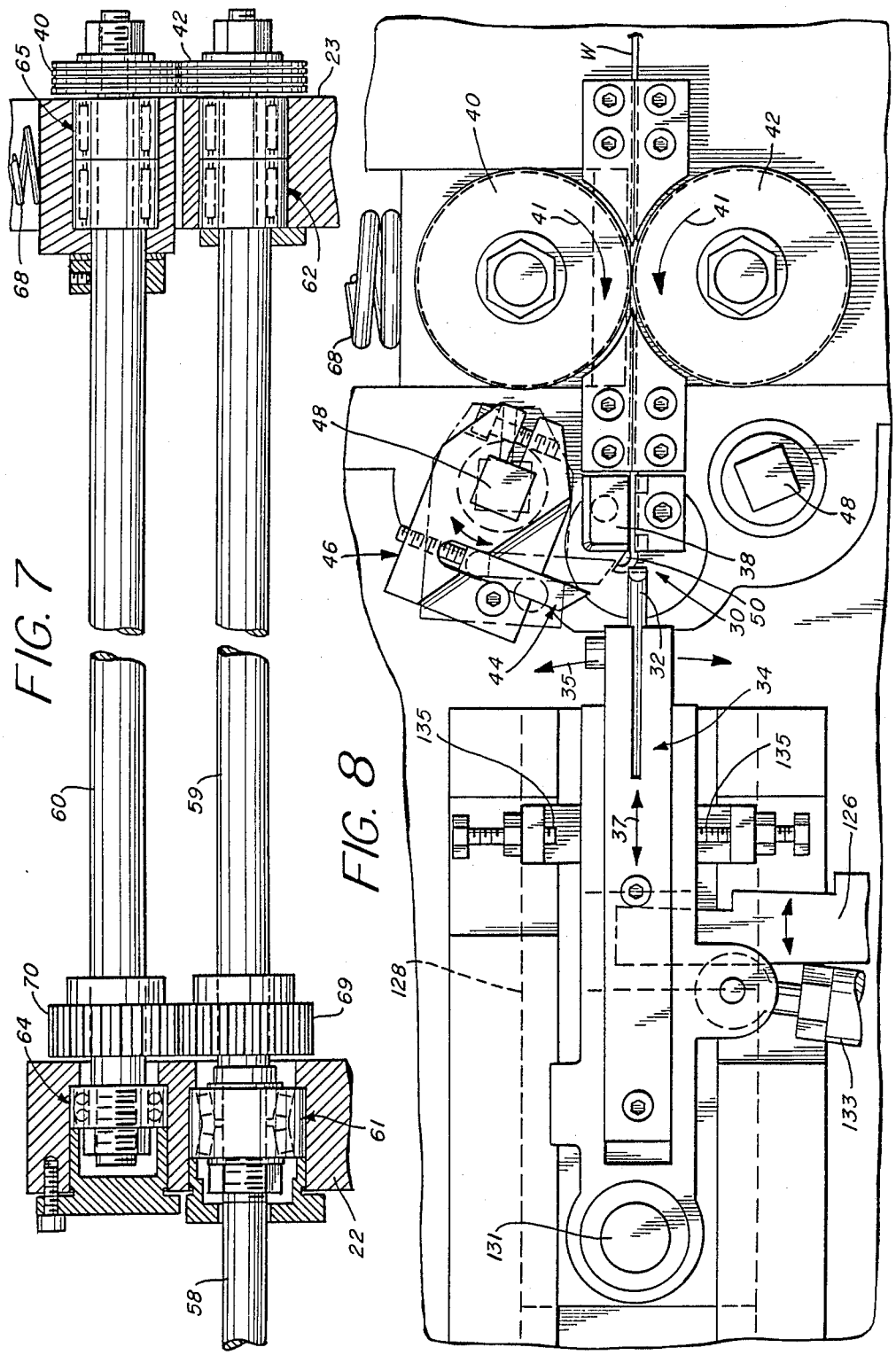

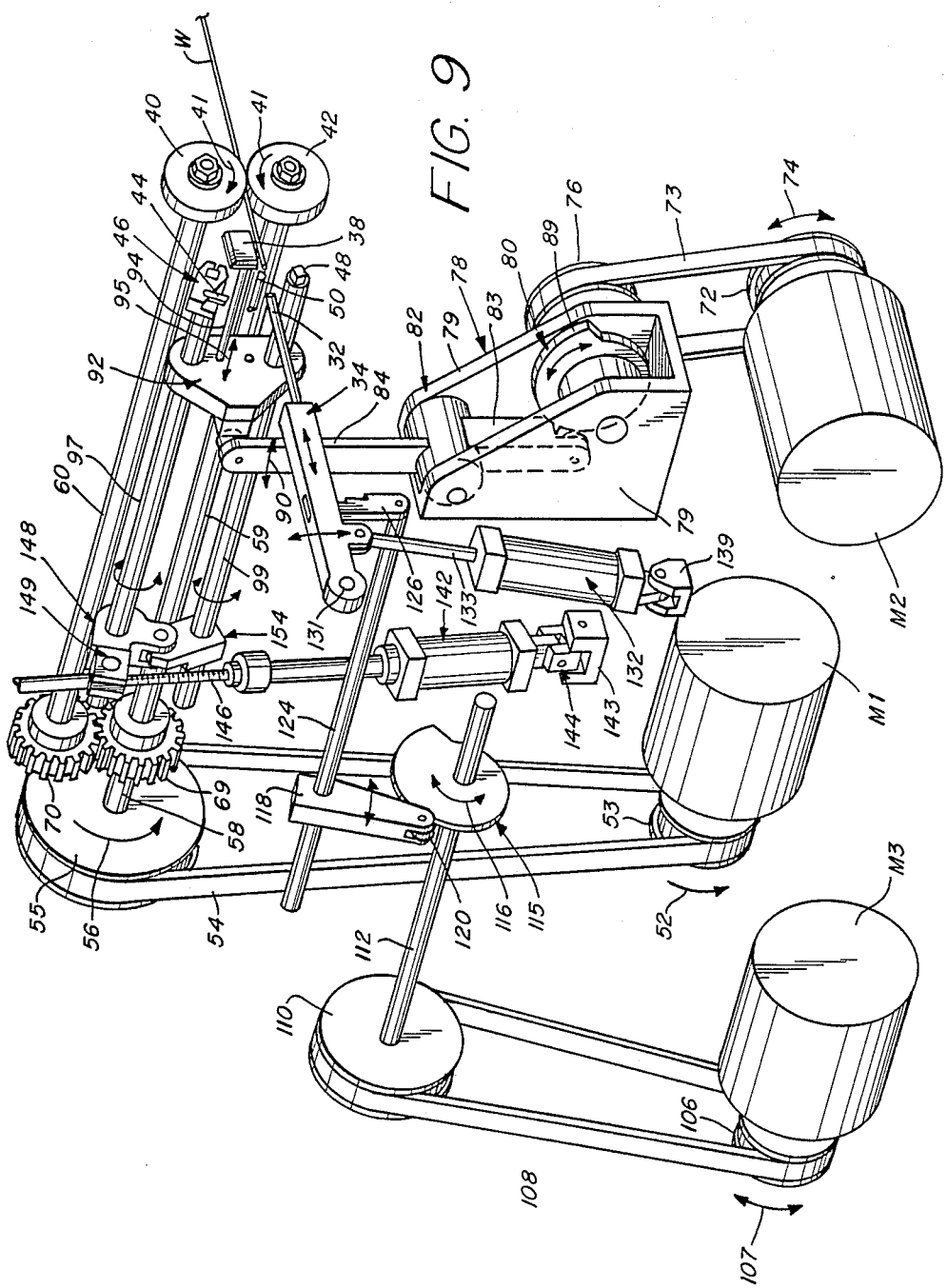

COMPUTER CONTROLLED COILING MACHINE

RELATED APPLICATION

This application relates to the present assignee's co-pending application, Ser. No. 07/116,068, filed Oct. 30, 1987.

BACKGROUND OF THE INVENTION

1. Field of the Invention

The present invention relates in general to a wire coiling machine for forming a wide variety of different types of coil springs including, but not limited to, tension and compression springs. More particularly, the present invention pertains to a computer controlled wire coiling machine that is controlled to permit programming of a wide variety of springs.

2. Background Discussion

Various types of wire coiling machines are generally known in the art. By way of example, refer to U.S. Pat. No. 1,266,070 to Sleeper and U.S. Pat. No. 2,175,426 to Blount et al. Each of these patents show wire feed rollers that are in constant engagement with the wire but are driven intermittently by means of a reciprocable gear segment of a variable throw. For further background in connection with the invention herein, also refer to the following U.S. Patents owned by the instant assignee herein: 4,372,141; 4,402,204; 4,416,135; 4,524,797; 4,528,831; and 4,607,513. These prior art wire coiling machines, such as the one described in U.S. Pat. 4,402,204 employ a cam shaft requiring a plurality of cams for controlling certain wire coiling functions. The cams are rotated at a cam shaft speed rate and because many of the operations carried out at the workstation are controlled from the cam shaft, the functions carried out are for the most part inter-dependent functions. These machines thus do not permit individual control of many of the parameters controlled at the workstation. Moreover, the machines described in these patents are not at all computer controlled.

The aforementioned application Ser. No. 07/116,068, filed Oct. 30, 1987 does describe a computer controlled coiling machine and generally teaches the use of separate control motors for wire feed as well as for pitch and diameter tool motions.

However, the system described in this related co-pending application contemplated a velocity feed profile that is substantially constant once the feed is brought up to speed. The operating speed in this system is limited by certain tool motions that occur and once the tool motions for a particular spring have been established then this likewise establishes the constant operating range of wire feed. Such a system has the characteristic of a relatively poor spring production rate.

OBJECTS OF THE INVENTION

Accordingly, it is an object of the present invention to provide an improved wire coiling machine and one which, in particular, is characterized by its computer control.

Another object of the present invention is to provide an improved wire coiling machine that is characterized by separate and independent control of predetermined parameters relating to the formation of coil springs.

A further object of the present invention is to provide an improved wire coiling machine as in accordance with the preceding object and which in particular is adapted for independent control of feed speed, pitch tool movement and diameter tool movement.

Still another object of the present invention is to provide an improved wire coiling machine characterized by computer control of the machine including the provision for entry of data for setting predetermined parameters regarding wire feed, spring pitch and spring diameter in connection with the construction of a predetermined spring configuration.

Another object of the present invention is to provide an improved wire coiling machine that is characterized by optimization of spring output which, in turn, is carried out by virtue of optimizing speed, particularly at locations in the spring forming interval during which there is no tool movement.

A further object of the present invention is to provide an improved system for controlling the feeding of wire to a workstation of a wire coiling machine by controlling the feed-rate over a velocity profile that is not constant but which instead has a velocity that is a function of tool motion; the velocity profile increasing in the absence of tool motion and being maintained at a generally lower velocity level during tool motion.

Still a further object of the present invention is to provide an improved method for controlling the feeding of wire to a workstation of a wire coiling machine that involves determination of work tool movement in combination with maintenance of the velocity of wire feed in a predetermined velocity range during work tool movement followed by increase of the velocity to a velocity greater than the predetermined velocity range when outside of a work tool motion interval, or in other words when there is no work tool motion or alternatively when the work tool motion is very gradual.

SUMMARY OF THE INVENTION

To accomplish the foregoing and other objects, features and advantages of the invention there is provided, in accordance with one aspect of the present invention, a method of controlling the feeding of wire to a workstation of a wire coiling machine for the formation of a coil spring and with the use of at least one moveable work tool that is disposed at the workstation and that is selectively operated to move to different positions during the formation of a desired spring configuration. The aforementioned work tool may be a pitch or diameter tool and in accordance with the preferred embodiment of the invention the method is employed in association with both a pitch and a diameter tool. The control method of the present invention includes the steps of providing a feed mechanism for feeding wire to the workstation and controlling the velocity of wire feed to optimize the rate of spring making. This step of controlling the velocity of wire feed include determination of when work tool motion occurs, maintaining the velocity of wire feed in a predetermined velocity range during this work tool motion, and increasing the velocity of wire feed to a velocity greater than the predetermined velocity range upon termination of the work tool motion. This determination of intervals of work tool motion and attendant feed control is instrumental in optimizing the speed of spring making. In other words, even though the speed of feed during tool motion is limited to a particular feed speed, in accordance with the present invention once the termination of this motion has occurred then the system operates so as to immediately speed up the feed rate so that the spring can be manufactured more quickly. Upon a subsequent work tool motion determination the step is performed of increasing the velocity of wire feed over an interval between work tool movements that includes a ramp up in velocity to an intermediate point in the interval followed by a ramp down in velocity. This ramping up and ramping down is necessary in order to have the wire speed velocity come back to that which is desired for the next tool motion interval.

In accordance with further features of the present invention the coil spring may be considered as being formed over a forming period and the step of controlling the velocity of wire feed may be considered as including providing a velocity profile that starts essentially at zero at the beginning of the forming period, increases in velocity until a tool movement is sensed, and as far as the end of the forming period is concerned the velocity profile decreases in velocity upon termination of a tool movement. The wire feed preferably decreases to zero at the time that the spring is completed and the cutting action occurs. The step of maintaining the velocity of wire feed in a predetermined velocity range includes maintaining the wire feed substantially at a particular predetermined velocity. This is usually the maximum velocity that can reasonably be obtained for wire feed which, is a function of many variables including the rapidity with which the tool motion is to occur. For example, changes in pitch tend to occur quite rapidly in the construction of coil springs.

In accordance with still a further aspect of the present invention the method of control also applies in connection with the use of two work tools at the workstation. In this instance, the work tool that requires the lowest velocity of profile is controlling and even though the other work tool may be capable of operating at a greater velocity, the overall velocity is limited by the maximum velocity of the other work tool. In this way, there are actually steps in the velocity profile. In this connection the aforementioned step of maintaining the velocity of wire feed includes maintaining the velocity at a first minimum predetermined velocity range when both work tools are in motion, increasing the velocity of wire feed to a second predetermined velocity range when only one work tool is in motion and further increasing the velocity of wire feed to a third predetermined velocity range when neither tool is in motion.

In accordance with still a further aspect of the present invention, there is provided a system for controlling the feeding of wire to a workstation for the formation of a coil spring by means of at least on moveable work tool that is disposed at the workstation and that is selectively operated to move to different positions in the formation of a particular spring. A particular system disclosed herein describes moveable work tools that include a pitch tool and a diameter tool that are separately operated. The system of this invention comprises a feed mechanism for feeding wire to the workstation and computer control means for controlling the feed mechanism to optimize the rate of spring making. The computer control means includes data entry means for setting predetermined characteristics regarding wire feed and work tool motion in constructing the particular spring. Means are provided for determining from the entered data work tool motion intervals. Means are provided for maintaining the velocity of wire feed in a predetermined velocity range during the work tool motion interval and increasing the velocity of wire feed to a velocity greater than said predetermined velocity range when outside of the work tool motion interval.

BRIEF DESCRIPTION OF THE DRAWINGS

Numerous other objects, features and advantages of the invention should now become apparent upon a reading of the following detailed description taken in conjunction with the accompanying drawings, in which:

FIG. 6 is a cross-sectional view taken along line 6—6 of FIG. 2;

FIG. 7 is a cross-sectional view taken along line 7—7 of FIG. 2;

FIG. 8 is a more detailed enlarged fragmentary view of a portion of FIG. 1 in particular at the machine workstation;

FIG. 9 is a schematic perspective view illustrating the major parts of the machine and in particular illustrating the control at the workstation from the three separately controlled motors, namely the feed motor, the pitch tool control motor and the diameter tool control motor;

DETAILED DESCRIPTION

In connection with a description of a preferred embodiment of the present invention, reference is now made to the drawings herein. The drawings illustrate the details of a preferred embodiment of the machine and the associated control in accordance with the present invention. The drawings furthermore illustrate sequences of spring formation in connection with the construction of several spring configurations controlled in accordance with the concepts of this invention. FIG. 1A of the drawings illustrates a block diagram for the computer control system as in accordance with the invention.

The wire coiling machine has a workstation at which a coil spring is formed. The machine is comprised of a machine frame with a pair of feed rollers for providing feed of the wire to the workstation. A pitch tool and a diameter tool are disclosed along with associated means for supporting each of these tools as the workstation. In accordance with the invention, three motors are provided. There is a first motor selectively controlled to operate the feed rollers. There is a second motor selectively controlled to operate the pitch tool and lastly, there is a third motor selectively controlled to operate the diameter tool. A computer control means is provided including a keyboard entry means for setting predetermined parameters regarding wire feed, spring pitch and spring diameter in constructing a predetermined spring. The computer control has output lines for providing three separate control signals corresponding respectively to and for operating the first, second and third motors to thereby carry out the desired steps in forming the predetermined spring in accordance with the predetermined parameters that have been established.

Figure 1:
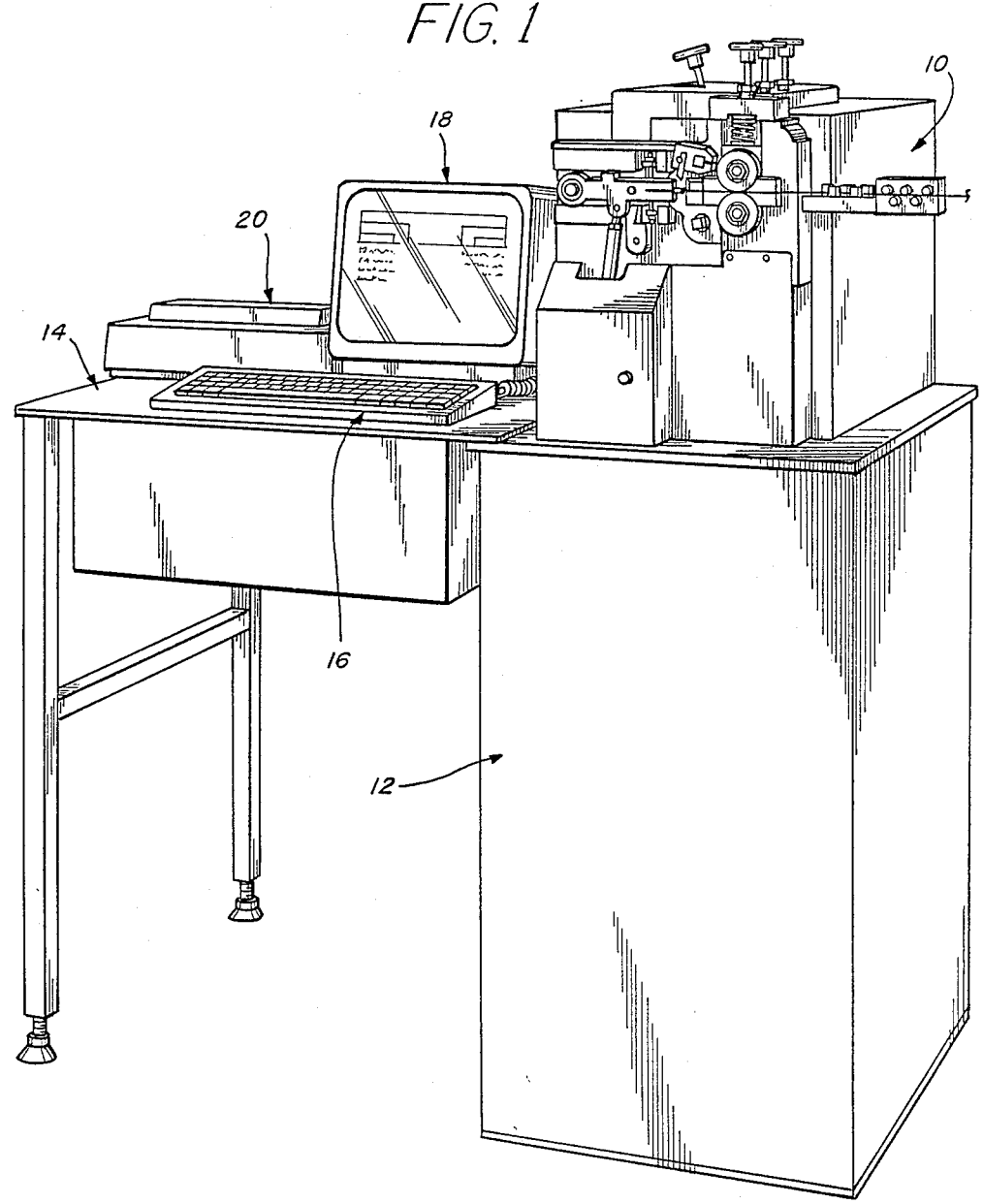
FIG. 1 is a perspective view of computer control coiling machine of the present invention.
Figure 1A:
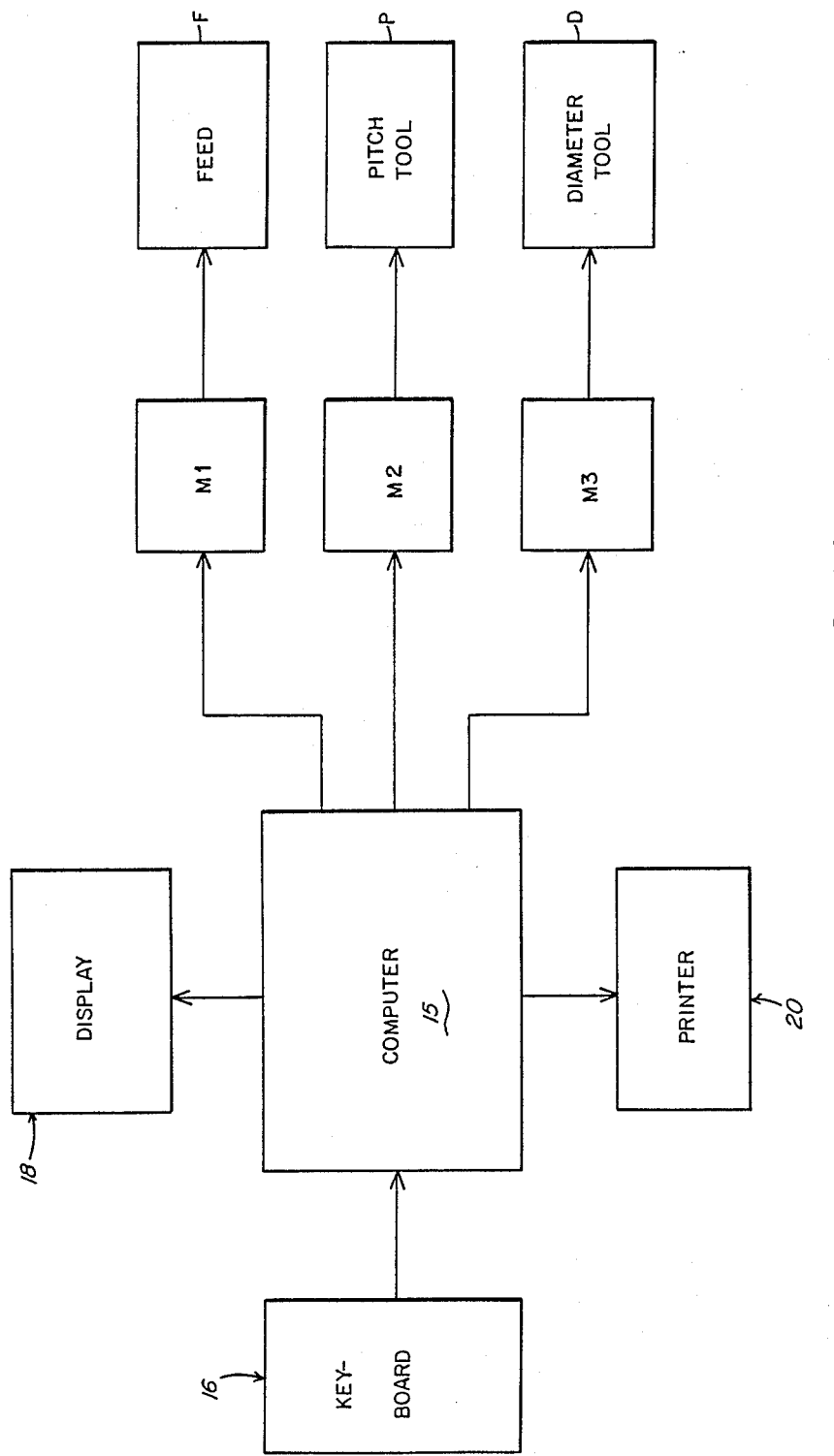
FIG. 1A is a block diagram of the computer control in accordance with the present invention illustrating the separate and independent control of feed, pitch and diameter motors.

With further reference to the drawings, FIG. 1 illustrates the overall machine in accordance with the present invention. In this regard there is provided a machine housing 10 inside of which are supported many of the mechanisms described hereinafter. The housing 10 is supported on an upright base 12. Extending adjacent to the base 12 is a table 14 upon which is supported the keyboard 16, display 18 and printer 20. Reference will be made hereinafter to these various components, particularly the computer related components, particularly in connection with the block diagram of FIG. 1A.

Now, referring to FIG. 1A, there is disclosed therein the computer 16. Associated with the computer 15 are the aforementioned keyboard 16, display 18 and printer 20, FIG. 1A illustrates three separate outputs from the computer 15 coupling to the respective control motors. These are described in FIG. 1A as motors M1, M2 and M3. Each of these separate motors control the parameters identified in FIG. 1A as the feed F, pitch tool control P and diameter tool control D. Reference will be made hereinafter to the control associated with the block diagram of FIG. 1A.

Figure 2:
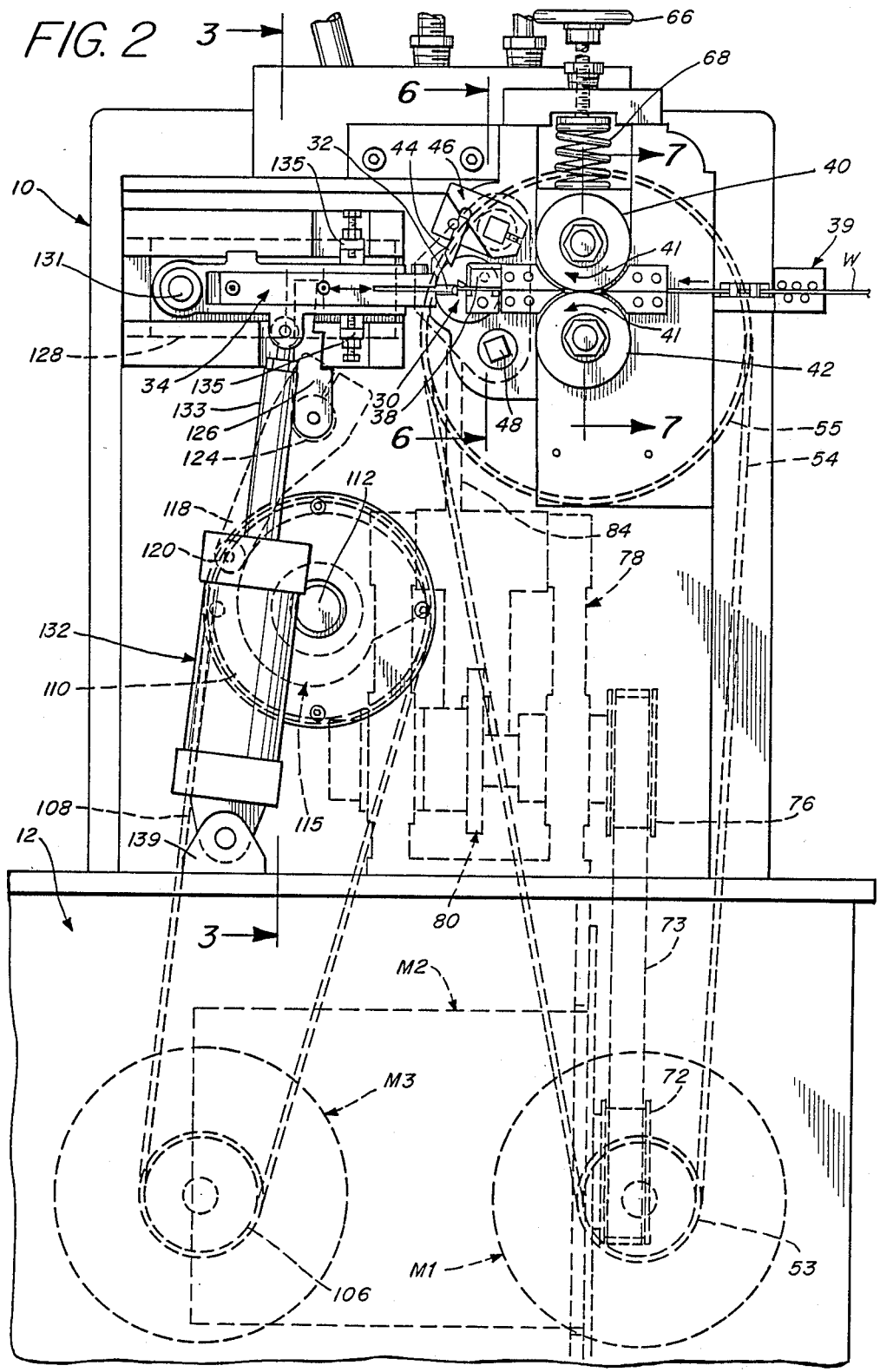
FIG. 2 is a front elevation view of the coiling machine of FIG. 1 illustrating the separate control of feed, pitch tool and diameter tool.
Figure 3:
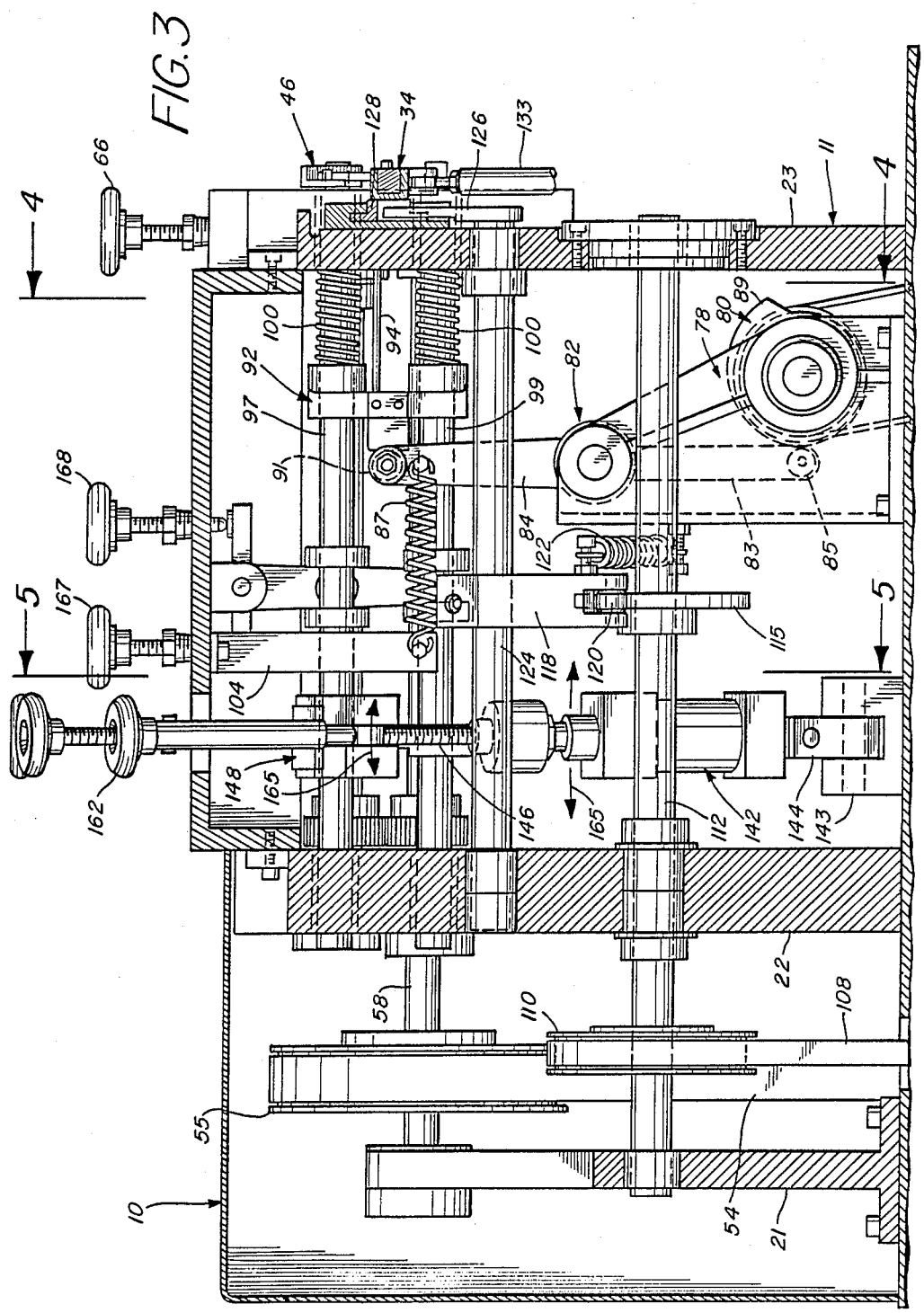
FIG. 3 is a cross-sectional view taken along line 3—3 of FIG. 2.

With further reference now to the details of FIGS. 1–9, within the housing 10 there is provided a machine frame 11 including, as depicted in FIG. 3, upright support members 21, 22 and 23. These support members are for support of various components comprising the wire coiling machine. Primarily, these upright members are for support of control shafts supported in the machine. The base 12 is primarily for the support of the motors. For example, FIG. 2 shows the feed motor M1, the pitch motor M2 and the diameter motor M3 all supported in the base 12. Each of these motors may be supported in a suitable manner not described in detail herein.

Reference is now made to FIG. 2 for an illustration of, not only the control motors supported in the base 12, but also the components that are controlled therefrom. FIG. 2 depicts a workstation generally at 30. For further details of the workstation area, also refer to the enlarged fragmentary view of FIG. 8. At the workstation 30 there is provided the diameter tool 32 supported by the tool holder 34. In FIG. 8 the arrows 35 and 37 illustrate the directions of movement that may take place of the holder 34 and likewise of the diameter tool 32.

FIGS. 2 and 8 also illustrate the pitch tool 38 at the workstation 30 and positioned, as described in further detail hereinafter, to be moved into the path of the wire W. Various guides are employed for directing the wire W to the workstation, such as illustrated at 39 in FIG. 2.

The wire W is fed to the workstation by means of the pair of feed rollers 40 and 42. These rollers are rotated in the direction indicated by the arrows 41 in FIGS. 2 and 8. The selective operation of the feed rollers 40 and 42 is discussed in further detail hereinafter.

Also disposed at the workstation 30 is the cutting tool 44 supported in holder 46 and operated from one of the two cut-off shafts 48. FIG. 2 also shows the alternate cut-off shaft 48 at a lower position at the workstation.

Thus, the wire W is fed by the feed rollers 40 and 42 through certain guide means to the workstation. Also disposed at the workstation is a coiling arbor 50 that the wire is coiled about and forming the spring. The pitch tool 38 controls the pitch of the coil and the diameter tool 32 controls the diameter of the coil.

In connection with the following description, reference may also now be made to the perspective view of FIG. 9. FIG. 9 illustrates the basic overall operation in connection with the control of the various components from the computer controlled motors, namely motors M1–M3. The motor M1 controls the feed of wire. This motor has an output shaft that rotates in the direction of the arrow 52. The output pulley 53 of the motor M1 drives a belt 54 which in turn drives the pulley 55 in the direction of arrow 56. The pulley 55 is secured to the lower feed roll shaft 58. The shaft 58 couples to the inline feed roller support shaft 59. Similarly, there is also provided an upper feed roller shaft 60. The feed roller 40 is secured to the shaft 60 and the feed roller 42 is secured to the shaft 59. In this regard, refer to FIGS. 3 and 7.

The lower feed roller shaft is supported by a bearing 61 at one end and by bearings 62 at the other end. Similarly, the upper feed roll shaft 60 is supported at one end by bearing 64 and at the other end by bearings 65. The bearing support arrangement permits a limited amount of relative movement between the feed rollers 40 and 42. The feed roller 40 is biased into contact with the feed roller 42 by means of the feed roller tension adjustment handle 66 and associated coil spring 68. This is an arrangement similar to that disclosed in U.S. Pat. No. 4,402,204.

Mounted on the feed roller shaft 59 is a gear 69. Similarly, mounted on the shaft 60 is a gear 70. The gears 69 and 70 are intermeshed. When the pulley 55 is driven from the feed motor M1 these interengaging gears cause the feed rollers 40 and 42 to rotate in the direction of the arrows 41 as depicted in, for example, FIGS. 2 and 9.

Reference is now made to the operation of the motor M2 that is the motor that controls the pitch tool. The motor M2, such as depicted in FIGS. 2 and 9, has an output pulley 72 that drives the drive belt 73. The pulley 72 is driven in an oscillatory manner as indicated by the bi-directional arrow 74 in FIG. 9. The belt 73 drives a further pulley 76 secured to a shaft supported by member 78. Member 78 includes sidewalls 79 between which the cam 80 is supported. The cam 80 is thus driven from the motor M2 in one direction or the other depending upon the desired positioning of the associated pitch tool 38.

Also supported in the open member 78 is the pitch tool follower 82 including oppositely extending follower arms 83 and 84. FIG. 3 in particular depicts a roller 85 associated with the arm 83. Also associated with the pitch tool follower 82 is return spring 87. The return spring 87 is secured to the arm 84 and biases the arm 83 so that the roller 85 is against the cam surface of cam 80.

The cam 80, such as depicted in FIG. 3, has a cam surface 89 that has a gradual varying diameter. In this connection, also refer to FIG. 9 for an illustration of the cam surface. As the motor M2 rotates in one direction or the other the cam surface is swept against the roller 85 and causes the arm 84 to move in one direction or the other. This bi-directional movement of the arm 84 is depicted in FIG. 9 by the bi-directional arrow 90.

The top end of the arm 84, as depicted in, for example, FIG. 6, carries a roller 91 that engages the pitch tool carriage 92. The carriage 92 carries a locking pin 93 for locking the pitch tool 38 in place. The pitch tool 38 is carried by a tool shaft 94 as depicted in FIG. 6. FIG. 6 also illustrates by the arrow 95 the general bi-directional movement of the shaft 94 and thus also of the pitch tool 38. This movement is either toward or away from the wire with the displacement relative to the wire being a function of the desired pitch.

The pitch tool carriage 92 is carried by the cut-off shafts 97 and 99. FIG. 6 illustrates these cut-off shafts 97 and 99 with the carriage 92 transitioning thereon. The carriage 92 is biased against the roller 91 by means of a pair of coil springs 100 one associated with each of the cut-off shafts. Each of the springs 100 extends between the carriage 92 and an associated bushing 102. In FIG. 6 it is noted that the cutting tool holder 46 is secured to the cut-off shaft 97. The end of the shaft 99 extends to the shaft 48 that may support an auxiliary cutting tool.

Figure 4:
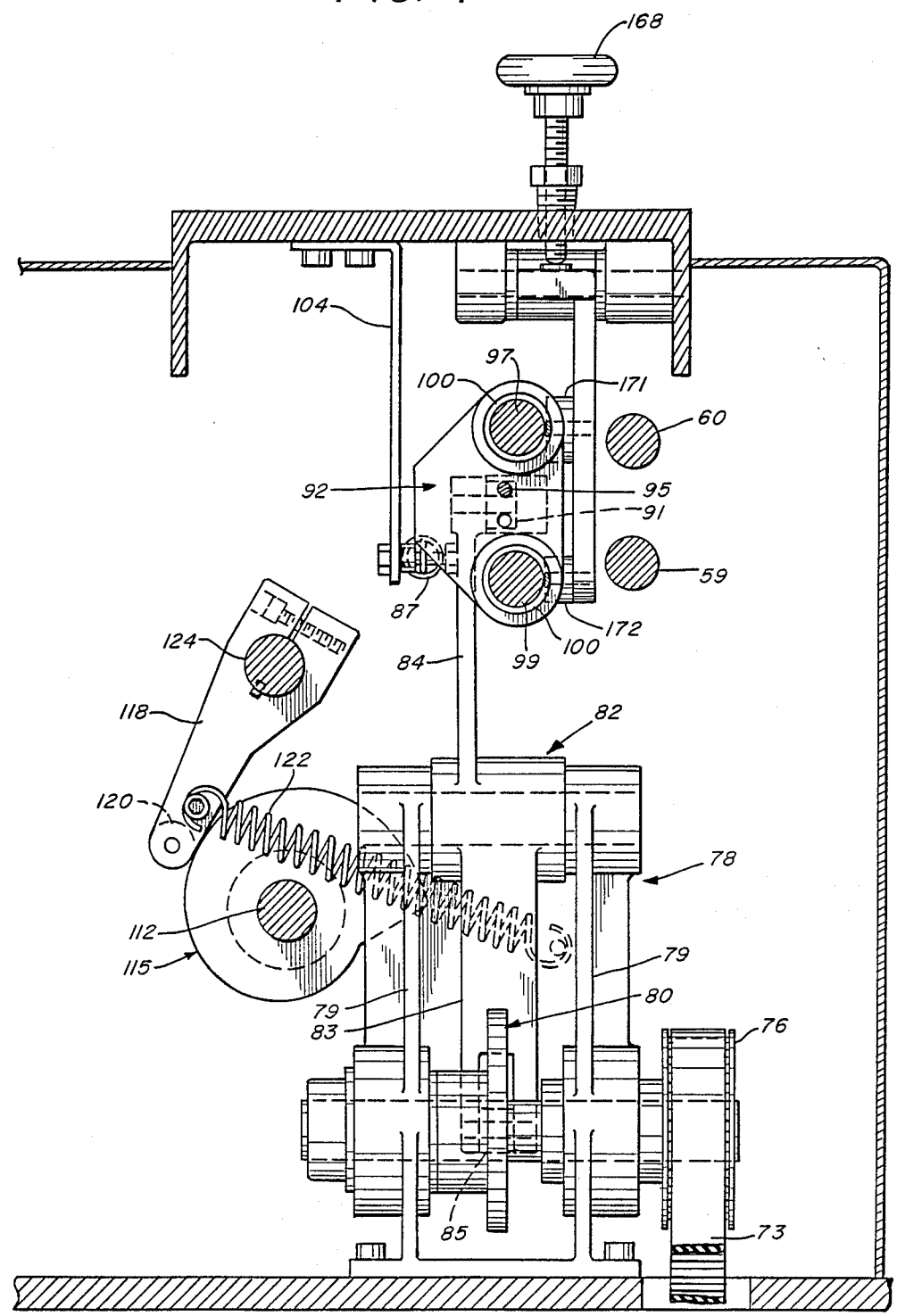
FIG. 4 is a cross-sectional view taken along line 4—4 of FIG. 3.

FIG. 4 also illustrates the cut-off shafts 97 and 99, as well as the pitch tool carriage 92. FIG. 4 also shows further details of the member 78 supporting the associated pitch tool control cam 80. Also illustrated in FIG. 4 is the carriage return spring 87 which is actually secured to the arm 84. The fixed end of the spring 87 is supported at an anchor strip 104.

Now, reference is made to the third motor, namely motor M3 which is the motor that controls the diameter tool 32. The motor M3 has an output pulley 106 that is adapted to be rotated in a bi-directional manner as indicated by the arrow 107 in FIG. 9. The pulley 106 drives the belt 108 which in turn engages with the pulley 110. The pulley 110 is supported on the shaft 112. FIG. 3 in particular illustrates the shaft 112 supported in members 21, 22, and 23. The shaft 112 supports the oscillatory cam 115. In FIG. 9 the direction of movement of the cam 115 is illustrated by the bi-directional arrow 116. Engaged with the oscillatory diameter tool cam 115 is the follower arm 118 which carries at its lower end a roller 120. The follower arm 118 also supports one end of a return spring 122 illustrated in FIG. 4. The other end of the return spring 122 is secured in a fixed manner such as from the member 78. The follower 118 is supported upon the shaft 124. The shaft 124 is also illustrated in FIG. 3 and is supported between the upright members 22 and 23.

The selective rotation of the shaft 124 controls the arm 126. Now, with further reference to FIG. 8, it is noted that the arm 126 operates the slide 128 which controls the movement of the diameter tool holder 34 in the direction of bi-directional arrows 37. The diameter tool 32 is also adapted to move in the direction of arrows 35 illustrated in FIG. 8. This is carried out by means of raising and lowering the tool holder, essentially pivoting at pivot 131. This action is carried out by the piston 132 such as is illustrated schematically in FIG. 9. Also associated with the action of the diameter tool holder in the direction of arrows 35 are the stops 135 as illustrated in FIG. 8.

As indicated previously, there is provided a piston 132 that is operated to essentially pivot the diameter tool holder. FIG. 2 illustrates the piston 132 secured at one end by securing bracket 139. The other end of the piston 132 has a piston rod 133 that couples directly to the tool holder for moving the tool holder in a pivoting action at the pivot point 131. As indicated previously, this causes the transition of the diameter tool 32 in the direction of the arrows 35 in FIG. 8.

Figure 5:
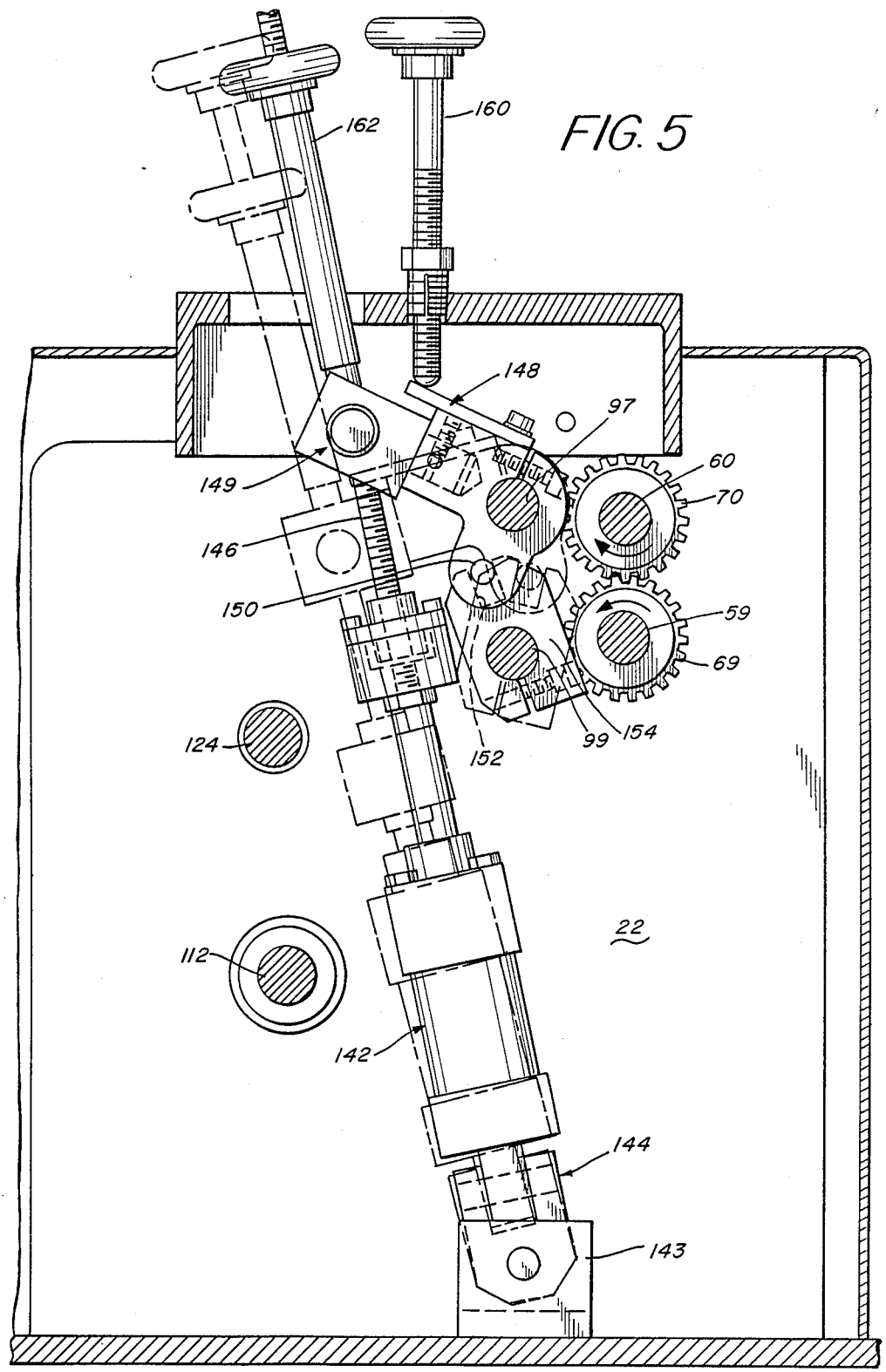
FIG. 5 is a cross-sectional view taken along line 5—5 of FIG. 3.

Now, in connection with the cutting tool operation, reference may be made to FIGS. 3, 5 and 9. In this connection, the cut-off shafts 97 and 99 are operated from the cut-off cylinder 142. The lower end of the air cylinder 142 is supported from support member 143 by means of the universal joint 144 as illustrated in FIG. 5. The threaded shaft 146 associated with the air cylinder 142 supports an actuating member 148 at the universal joint 149. The actuating member 148 is secured to the cut-off shaft 97. The member 148 supports a pin 150 that is adapted to fit within a groove 152 in the counterpart member 154. The member 154 is supported from the shaft 99. The pin 150 and the groove 152 provides cooperative action between the shafts 97 and 99.

In FIG. 5 the air cylinder 142 is shown extended for its non-cutting position and is illustrated in full outline in that position. The air cylinder 142 is also shown in phantom for its cut stroke. In FIG. 5 the member 160 is a cut-off tool swing adjustment for the open or non-cutting position. Also, in FIG. 5 the member 162 provides for cut-off tool swing adjustment for the cut-off stroke.

Referring to FIG. 3, it is noted that the cut-off air cylinder 142 is adapted to pivot in two directions to allow for actuation and adjustment for different wire diameters. In this regard note the arrows 165 in FIG. 3.

In FIG. 3, reference is also made to the adjustment knobs 167 and 168. These knobs adjust the cut-off tool in and out for different diameter wire grooves in the feed rollers. In this regard also refer to FIGS. 4 and 6. As particularly illustrated in FIG. 6, there are provided different diameter rollers at 171 and 172. This compensates for the different throw of the rocker arm when adjusting the cut-off tool to wire diameter. The larger diameter roller compensates for a shorter swing of the adjustment arm. The smaller roller provides for a large swing.

Figure 16:
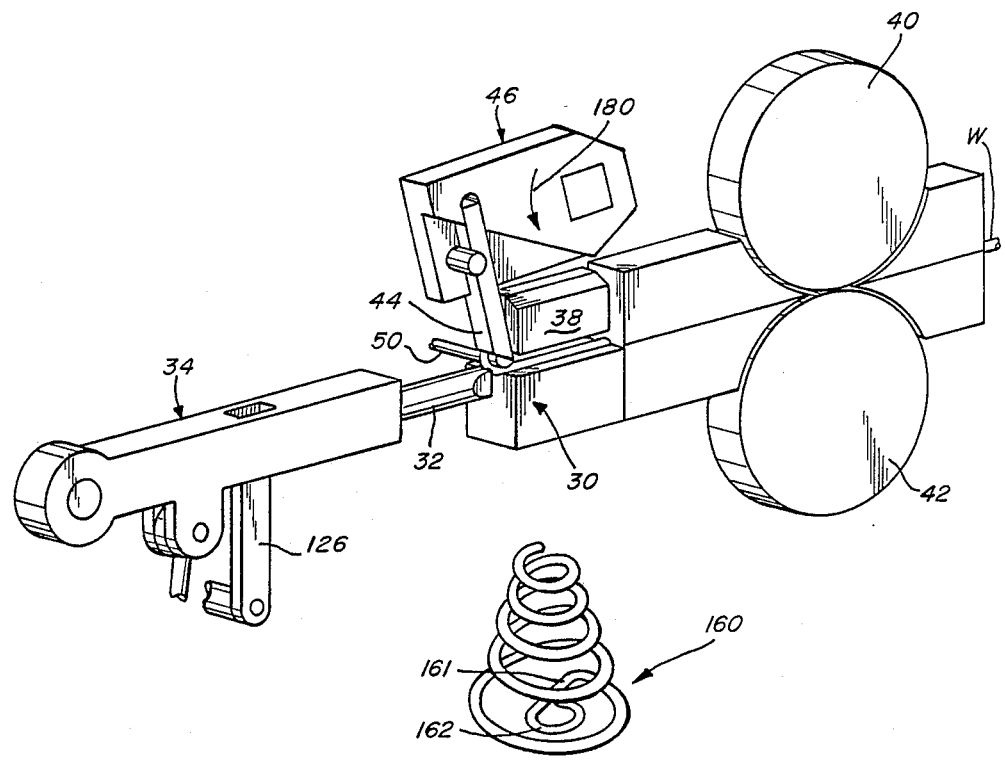

In connection with the spring construction of FIG. 16, the control principles of the present invention as it relates to an improvement in spring rate production, can apply to this configuration of spring. However, the principles of the present invention are described hereinafter primarily in connection with the control regarding spring constructions such as those illustrated in FIGS. 17B, 18B and 20.

Each of the sequential drawings illustrated in FIGS. 10-16 show the feed rollers 40 and 42 being selectively operated to feed the wire W to the workstation 30. Also illustrated in each of these sequential diagrams is the diameter tool 32, the pitch tool 38, the arbor 50, and the cutting tool 44. Each of the drawings also illustrate by representative arrows the direction of movement of the various tools.

Figure 10:
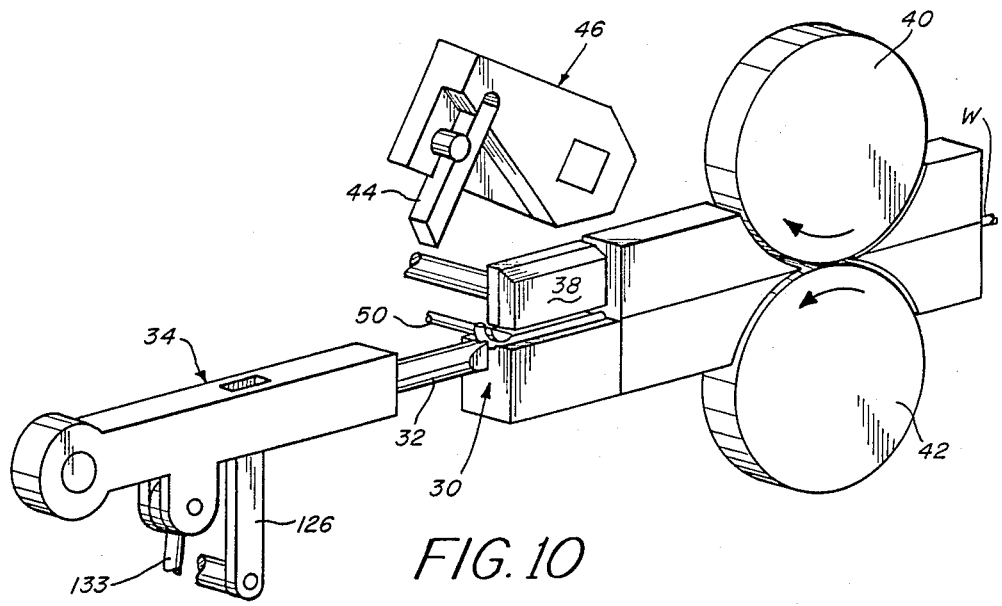
FIGS. 10–16 are fragmentary schematic diagrams illustrating a sequence of steps carried out in forming a tapered spring, the final form of which is illustrated in FIG. 16.

Now, in FIG. 10 this illustrates a very initial start in the formation of the spring. The wire has just been previously cut and the feed has just commenced. The pitch tool 38 is away from the workstation so that no pitch is made in connection with the formation of the initial coil. The initial coiling is just started in FIG. 10 with the wire being directed against the diameter tool 32. The diameter tool 32 is held in a predetermined longitudinal position as controlled by the arm 126 which in turn is controlled from the cam 115. Thus, the motor M3 is controlled under computer computer program control so that it controls the position of the diameter tool 32 to provide an initial diameter for the very initial loop 162 that is being formed. Also, the cut off tool 44 is shown in a position away from the workstation. Cutting will only occur at the end of the spring making sequence.

Figure 11:
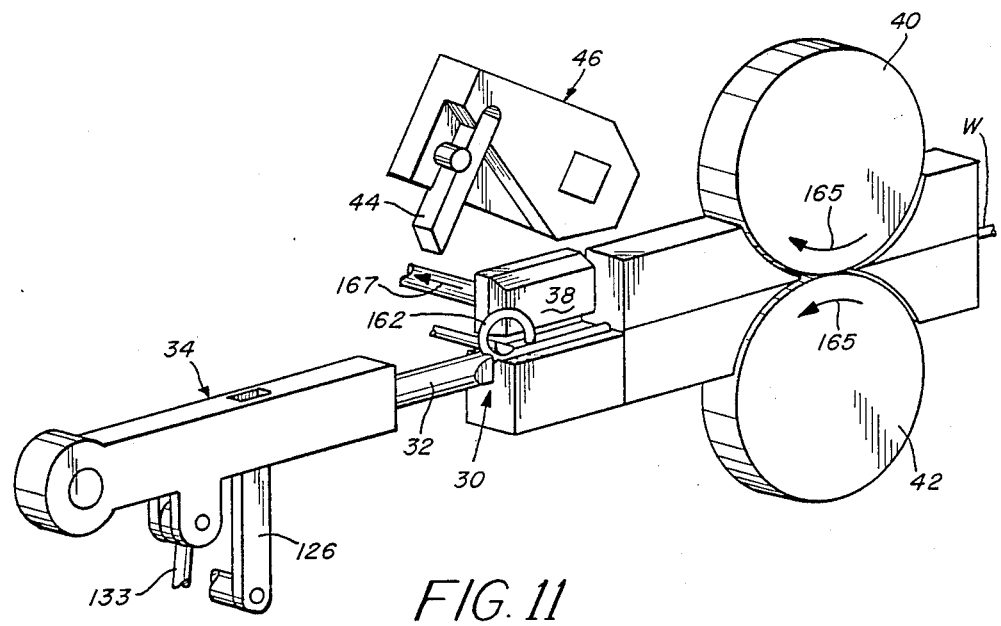

Now, reference is made to FIG. 11 showing the continuing sequence. In FIG. 11 the feed rollers continue to rotate as indicated by the arrows 165 and the complete loop 162 is then formed. During the formation of the loop, it is noted that the pitch tool 38 is away from the station as indicated by the arrow 167 in FIG. 11. The cutting tool 44 is also away from the workstation 30.

Figure 12:
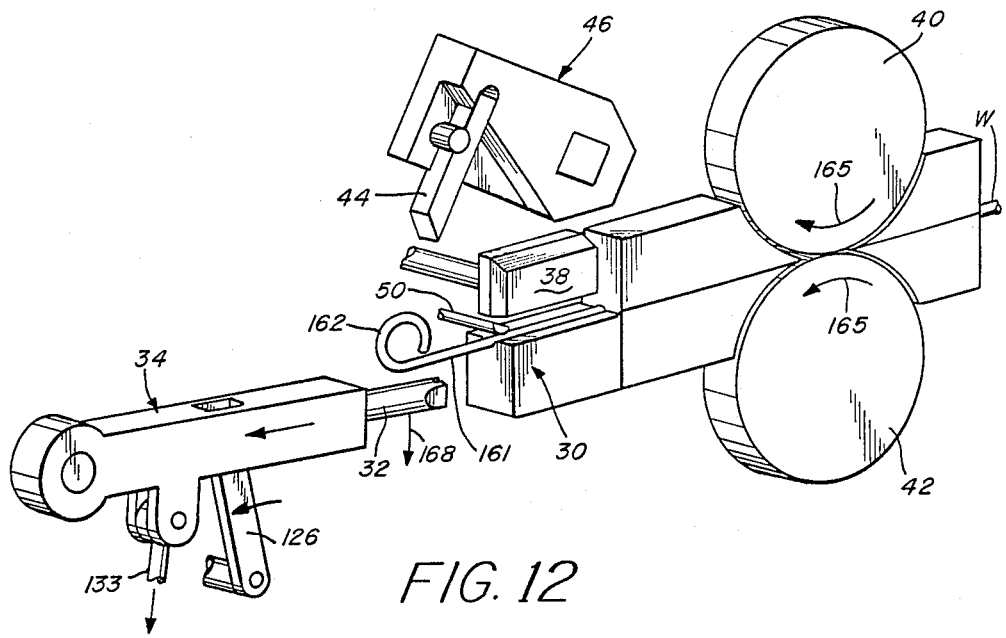

Reference is now made to the next step in the sequence illustrated in FIG. 12. This relates to the formation of the spring leg 161. In connection with this operation, it is noted that the pitch tool 38 is still away from the workstation 30, the cutting tool 44 is also away from the workstation. The feed rollers 40 and 42 continue to feed as indicated by the arrows 165 in FIG. 12. The diameter tool 32 is now operated to a pivoting occurs of the diameter tool holder 34 to a downward position. This is illustrated in FIG. 12. By doing this, the diameter tool 32 is thus out of engagement with wire and thus a straight leg 161 may then be formed by simply feeding the wire directly through the workstation.

Figure 13:
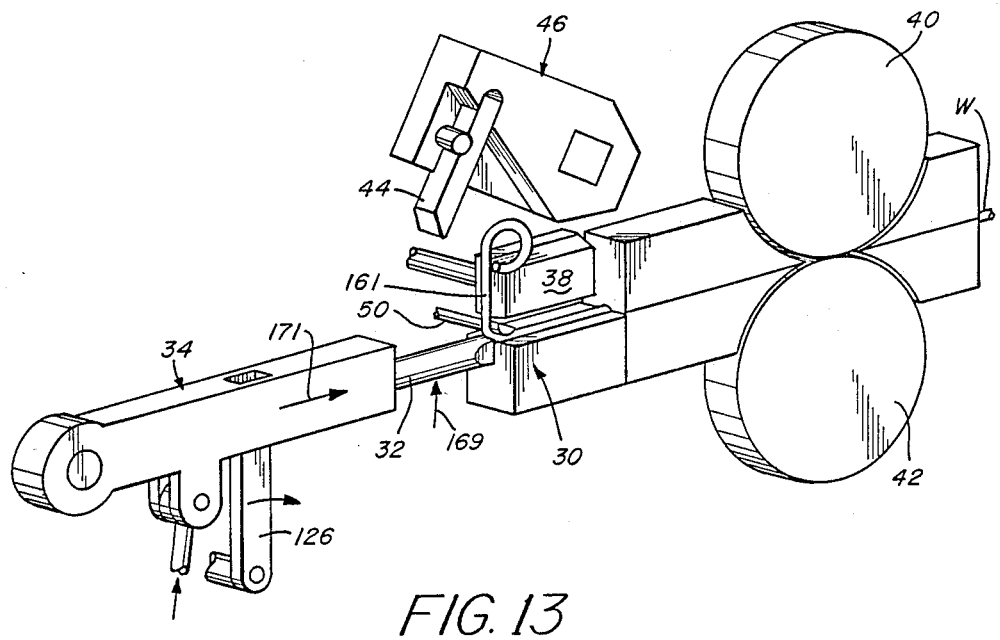

After a predetermined length of leg has been formed, then FIG. 13 illustrates the next step in the sequence. The diameter tool 32 is then moved upwardly as illustrated by the arrow 169 in FIG. 13. The arrow 168 in FIG. 12 illustrated the downward progression of the diameter tool 32. Prior to the diameter tool 32 moving upwardly, the feed is interrupted. This occurs by virtue of controlling the feed motor M1 so that the motor simply stops thus ceasing feed roller movement. Once this occurs then the diameter tool 32 moves in two directions. The tool moves upwardly as indicated by the arrow 169 and also moves inwardly as indicated by the arrow 171 in FIG. 13. The diameter tool preferably moves inwardly first and then moves upwardly to provide a bend as clearly illustrated in FIG. 13. This bend is formed about the arbor 50.

Figure 14:
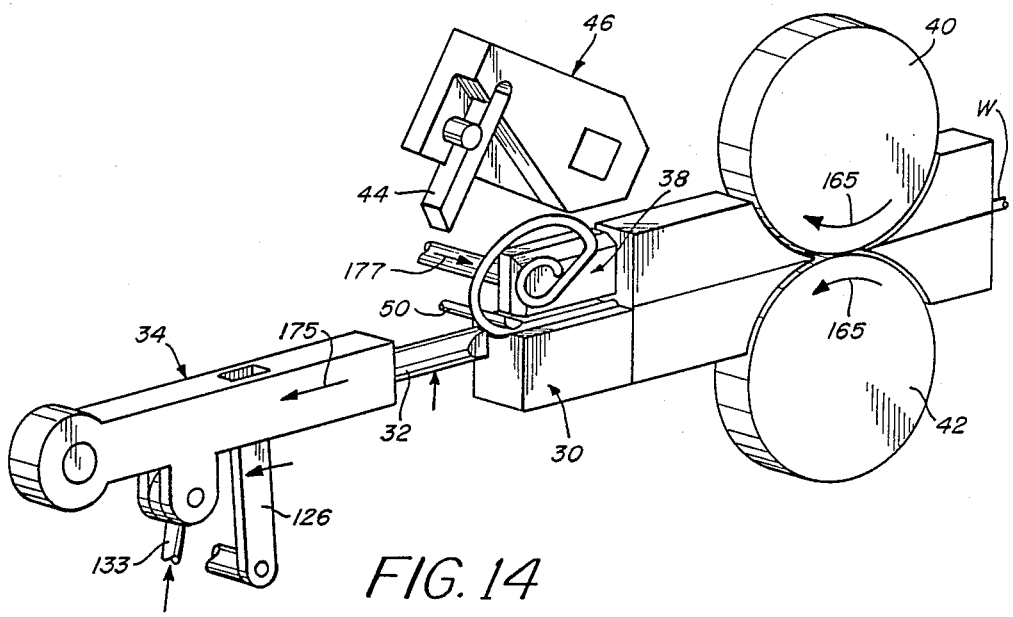

Reference is now made to FIG. 14 for a next step in the sequence. From FIG. 13 it can be seen that the entire leg 161 and loop 162 have now been formed and thus the rest of the spring is now formed by coiling. This now involved primarily only the diameter tool 32 and the pitch tool 38. With the particular spring illustrated in FIG. 16, the larger diameter section is now to be formed and in this larger diameter section the pitch is at a maximum when the diameter is at a maximum. The pitch and diameter then decrease to form the tapered spring as illustrated in FIG. 16.

Thus, in FIG. 14 the diameter tool 32 remains in its upper position but is moved outwardly as indicated by the arrow 175 in FIG. 14. The tool 32 is moved outwardly so as to provide a larger diameter coiling. At the same time the pitch tool 38 is also moved forwardly as indicated by the arrow 177 in FIG. 14. This thus provides a maximum diameter and a maximum pitch for initial coiling.

Figure 15:
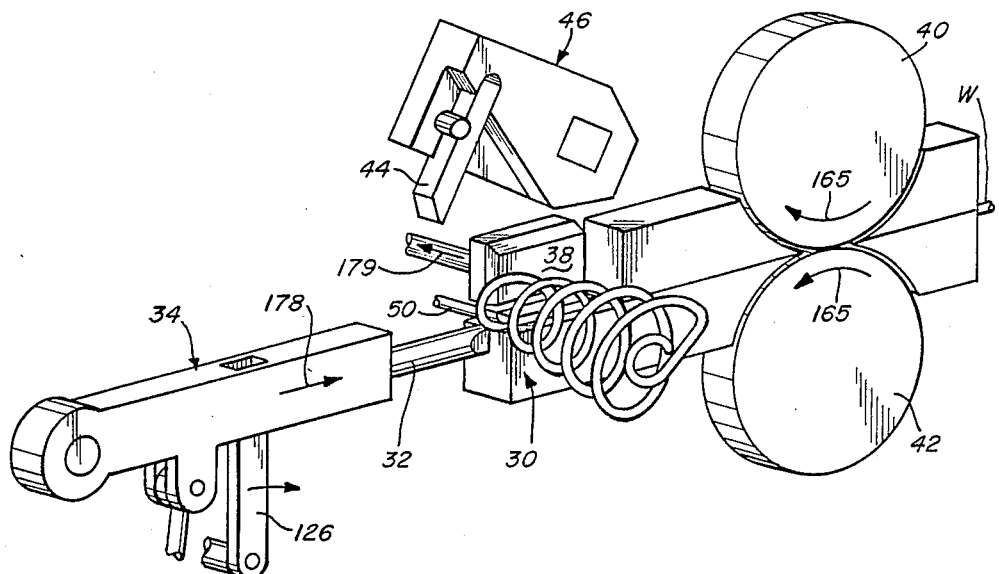

Reference is now made to FIG. 15 for a further sequence along the coiling step. Because one is fabricating a tapered spring the diameter decreases and at the same time the pitch also decreases These directions of movement of the respective tools are illustrated in FIG. 15. The diameter tool 32 gradually moves in the direction of the arrow 178 while the pitch tool 38 gradually moves in the direction of the arrow 179. This is a gradual pre-programmed movement. A movement of the diameter tool 32 is controlled from the cam 115. The movement of the pitch tool 38 is controlled from the cam 80. The cams 115 and 80 are in turn controlled from the diameter motor M3 and the pitch motor M2, respectively.

After the coiling sequence is completed, the spring is then cut. In this regard, refer to the diagram of FIG. 16. The cutting is carried out by means of the cutting tool 44 which is pivoted as illustrated in FIG. 16 in the direction of the arrow 180. As indicated previously, the finished spring is also illustrated in FIG. 16 of variable tapered construction with the leg 161 having end loop 162.

Reference has been made hereinbefore to FIG. 1A. This block diagram illustrates the basic computer control system including the keyboard 16 and computer 15. The computer may be of conventional design and is programmed in a manner to be described in further detail hereinafter, particularly in connection with the display diagrams of FIG. 17A and 18A. The pitch, diameter and feed controls are simple, direct and free of any backlash problems. The computer control system operates the mechanisms with extremely fine resolution sharing a precise control of speed and position.

The setting up of the system for making a particular spring can be carried out quite quickly. Values for spring pitch, spring diameter and speed of feed are entered directly at the keyboard 16. All cam work and manual adjustments for these functions have been eliminated. The software that is used with the system is menu driven, user friendly software. It is adapted to guide the operator, step by step, through the selection of values to be entered for any given spring. Thus, even a novice can learn how to make springs more quickly.

Figure 17A:
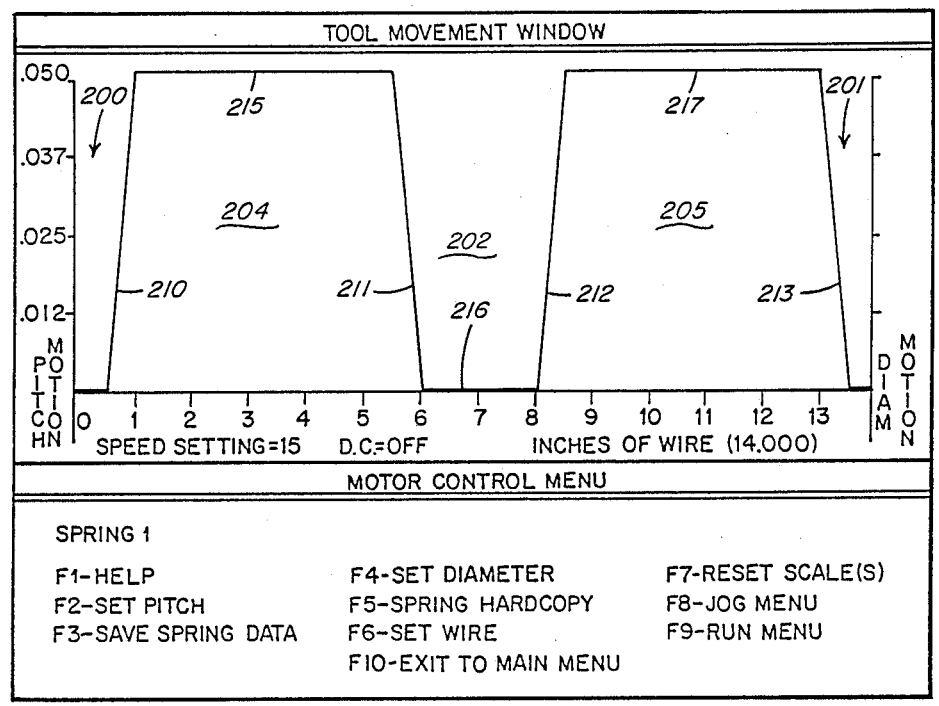
FIG. 17A is a timing diagram illustrating pitch tool motion in connection with the formation of a coil spring of predetermined configuration.
Figure 17B:
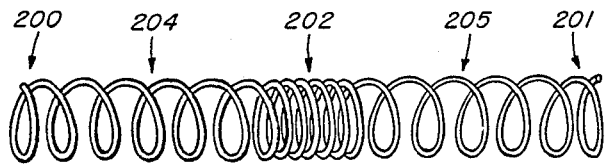
FIG. 17B is an illustration of the spring constructed in accordance with the timing diagram of FIG. 17A.
Figure 18A:
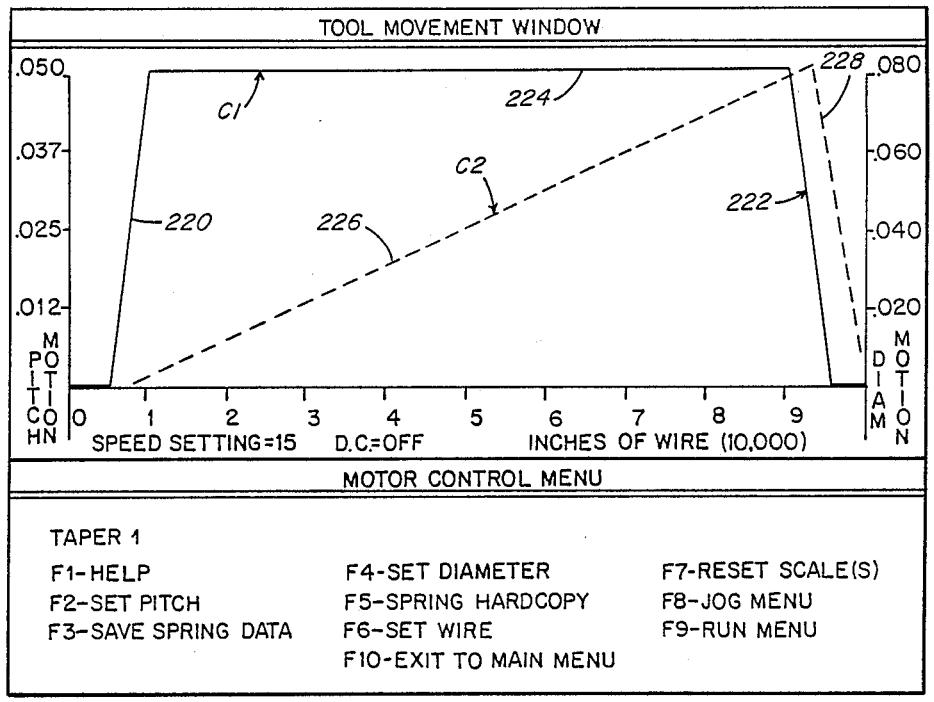
FIG. 18A is a timing diagram of an alternate spring construction employing both pitch and diameter tool motions.
Figure 18B:
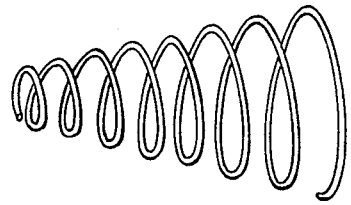
FIG. 18B illustrates the tapered spring configuration constructed in accordance with the timing diagram of FIG. 18A.

Now, with reference to the setting up of the operation while making a particular spring, reference may be made, by way of example to the spring construction of FIGS. 17B and 18B. Also refer to FIGS. 17A and 18A for a display or a timing diagram that may be used in assisting the operator in setting up the parameters for making a particular spring. In this connection, it is noted that the mode of operation is such that there are basically two different modes of operation. In one mode of operation the program is established at the keyboard in connection with the making of the particular spring Thereafter, the system can be set in the "run" mode of operation for carrying out the control in constructing the previously programmed spring.

When the operator is in the programming mode of operation, this is the time that the operator can enter all of the particular parameters relating to all of the segments of the spring. Thus, reference may now be made to a further spring construction such as that illustrated FIG. 17B which is a basic constant diameter spring having different pitch sections including end sections 200 and 201, a closed pitch center section 202 and open pitch sections 204 and 205.

Reference may also be made to the associated timing display diagram of FIG. 17A in which like reference characters have been applied to illustrate the different spring sections. Also refer to the associated table I to be described in further detail hereinafter.

In FIG. 17A the sloped lines 210, 211, 212 and 213 represent transitions or motion of the pitch tool. The horizontal lines such as the lines 215, 216 and 217 represent stationary tool action. It is during these intervals represented by the lines 215, 216 and 217 that the speed control of the present invention is realized by virtue of an increase in feed speed during those intervals.

In connection with FIGS. 17A and 17B, reference is now made to table I. Table I is helpful in understanding the velocity profile regarding the wire feed as well as gaining an understanding of motion of the pitch and diameter tools. In this connection, in table I it is noted that there are five columns, labeled as columns A, B, C, D and E. Column A represents a basic time interval. This may represent, for example a division of 10 millisecond intervals. These may be in a range of say 2-50 milliseconds. Column B represents cumulative inches of wire that is being fed. Column C represents feed steps. Generally, the feed motor is a stepper motor and thus column C represents digital steps in connection with the feed. The higher the number in column C the higher the feed rate. Column D represents pitch-tool steps. Column E represents diameter tool steps. It is noted in columns D and E that when the indication is "zero" this indicates no tool movement. It is furthermore noted in table I at column D that initially starting at about position "38" of column A that pitch tool motion commences. Column D also illustrates the rate of tool motion.

Reference will now be made to the particular intervals of column A as they relate to the columns C, D, and E and as they furthermore relate in particular to the feed speed as well as the motion of the pitch and diameter tools. Initially, it is noted that the feed speed increases as set forth in column C while there is no tool motion as represented by the columns D and E. This occurs through approximately interval "37" of column A. The segment of the spring that is being formed is the end section 200 as illustrated in FIG. 17B. Because the diameter tool has not moved it is at a constant diameter and without any movement of the pitch tool the end section is essentially closed. This forms the substantially square end on the spring.

Next, commencing at about interval "38" the pitch tool commences motion. There is still no motion of the diameter tool and in this particular spring construction there will be no diameter tool motion. At the commencement of this pitch tool motion it is noted that the feed speed is at approximately "331" in column C. It is furthermore noted that throughout this pitch tool movement at approximately intervals "38" through "54" the feed speed is maintained approximately constant. This represents the maintenance of velocity of wire feed in a predetermined velocity range or at a predetermined velocity point during work tool movement. This movement of the pitch tool occurs at the very commencement of the open pitch section 204 illustrated in FIG. 17B. Once the pitch tool has been moved out it ceases motion but is maintained at this moved-out position throughout the open pitch section 204.

Now, in accordance with the present invention rather than maintaining the feed rate at approximately the feed magnitude "333" of table I, the feed rate is substantially increased thereafter as illustrated by the time intervals between intervals "55" and "154". During this interval it is noted that there is no tool motion but that the feed speed increases to a peak at approximately interval "105". At that interval the feed magnitude is, as illustrated at column C, at step "748". The speed then decreases to time interval "154" in readiness for a further movement of the pitch tool. This would be the movement that occurs in the transition between the open pitch section 204 and the closed pitch center section 204 of the spring of FIG. 17B. It is noted in column D that at that point the intervals are indicated as negative intervals simply indicating that the pitch tool is moving in the opposite direction from its initial movement at the earlier intervals. The pitch thus goes back to its closed pitch position.

Thus, it can be seen that in accordance with the algorithm control of the present invention and as will be discussed in further detail in connection with the flow chart of FIGS. 21A and 21B, once tool motion ceases the machine is controlled to operate at an increased velocity, usually going to a peak velocity. Depending upon the capability of the machine it could go to a peak velocity and maintain that velocity. Thereafter, the system operates, because it has stored all of this data, to return back to a desired velocity in readiness for a further tool movement. This is what is illustrated in table I. It is noted that the feed rate returns to the range of "333" of column C which is approximately the same feed rate when the pitch tool initially moved out at intervals "38" through "54".

Now it is noted that after the pitch tool movement that terminates at about time interval "171" again there is a relatively short interval over which there is no tool motion. The short interval represent the relatively short section 202 of the spring that is being formed. This is a closed pitch section. It is noted even in this relatively short section that the velocity profile increases to again provide a peak at approximately time interval "200". Again the profile at this point is one of increasing to a peak and decreasing again to a point at approximately time interval "227" wherein a subsequent tool motion occurs. This would be the tool motion that occurs at the transition between the center section 202 and the open section 205 of the spring of FIG. 17B.

During the time interval from interval "227" through interval "243" it is noted that the pitch tool moves out once again and that during this pitch tool movement interval the speed is maintained substantially at a constant, substantially at a feed step rate of "333". Now, once the pitch tool has moved out for the purpose of creating the open coil section 205, the feed can speed up and this is clearly indicated in column C of table I by the increase in feed velocity, again to a peak value of "748" which occurs at time interval "294" in table I. Thus, the same type of peaking velocity characteristic occurs in association with the open section 205, as occurred previously in association with the formation of the open section 204 of the spring of FIG. 17B.

Finally, the pitch tool again moves back to its closed coil position. This movement is depicted in table I between the time intervals "344" and "360". Again, it is noted that this is indicated as a negative pitch indicating that the pitch tool moves back to its closed coil position. Again, it is noted that the velocity profile is at a feed rate of "333" for this pitch tool movement.

Because after this pitch tool movement the spring is now near completion, rather than an increase in velocity, the velocity decreases and essentially ramps down to zero velocity at time interval "400". This final step creates the very end 201 of the coil spring illustrated in FIG. 17B.

Figure 21A:
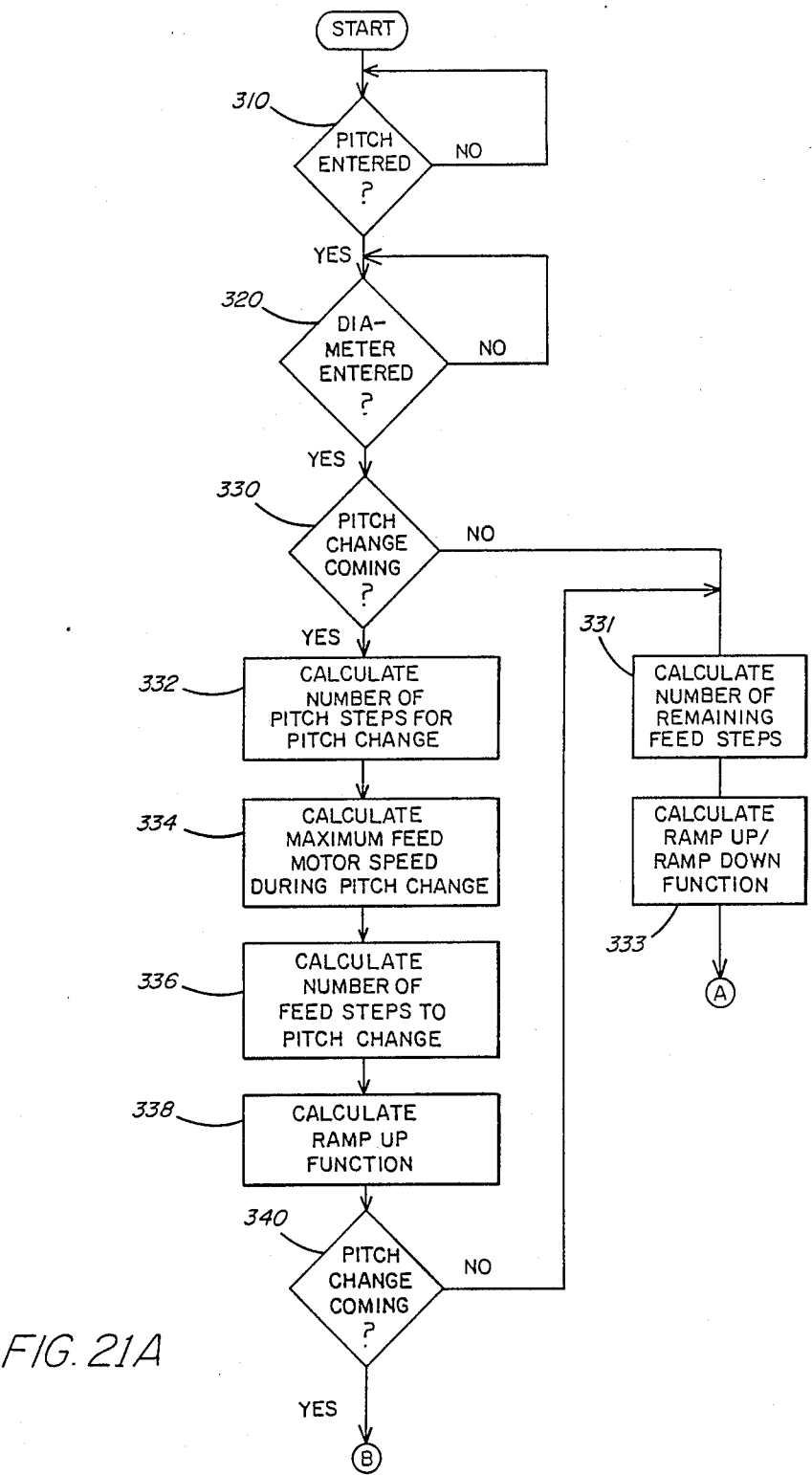
FIGS. 21A and 21B together set forth a flow chart illustrating the control as it in particular relates to the spring illustrated in FIGS. 17A and 17B.
Figure 21B:
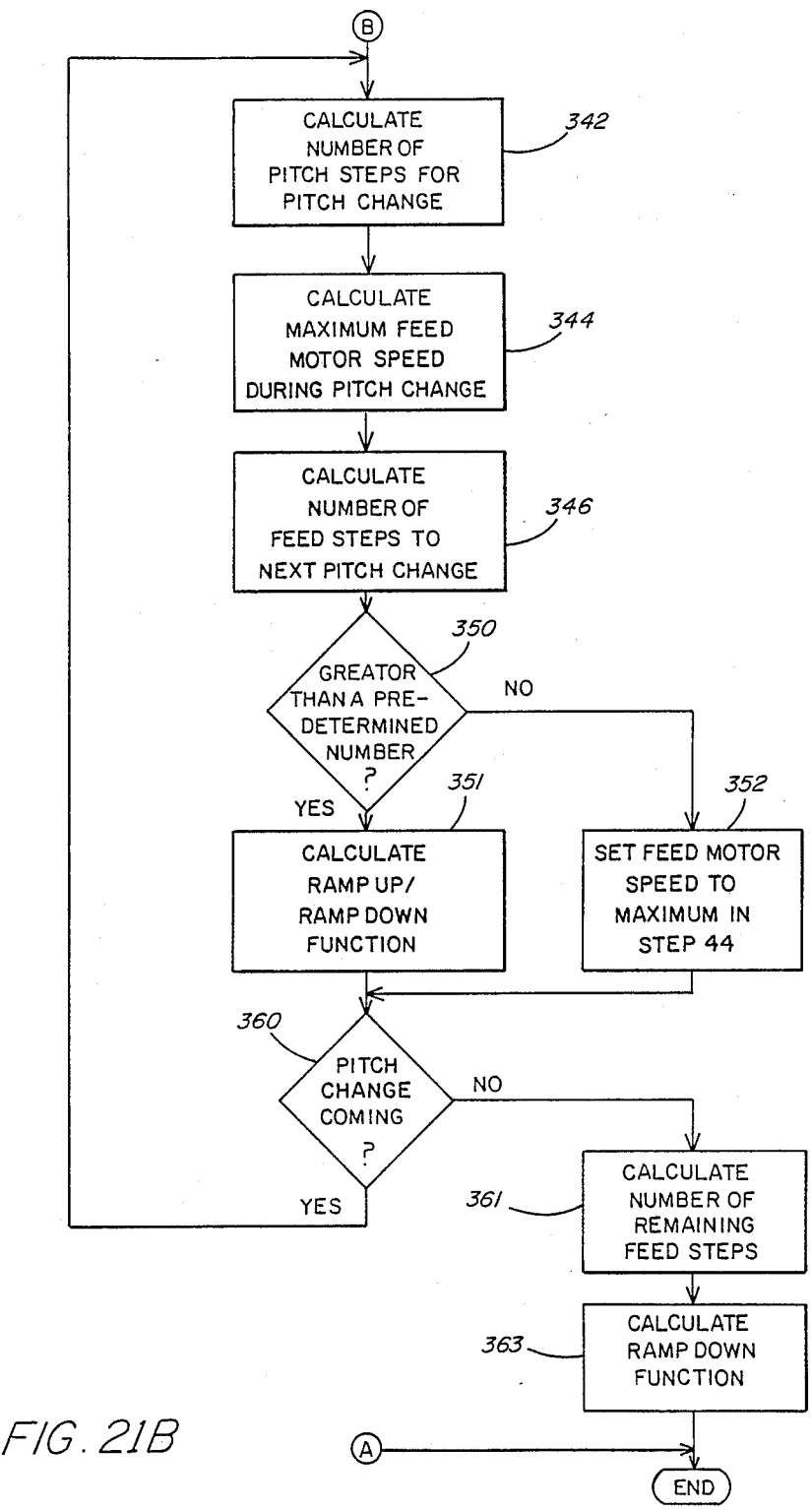

In connection with the particular spring construction of FIG. 17B, reference is now made to the flow chart illustrated in FIGS. 21A and 21B. This flow chart is illustrated herein for the purpose of a further explanation of the programming that is provided by the computer that provides the control of the various motors as it relates to feed speed and tool movement, particular pitch and diameter tool movement. In this connection, also refer to the attached comprehensive appendix A that provides a complete program that is generic to the preparation of springs of various type.

Now, in the first step 310, a check is made to determine if a starting spring pitch has been entered. If the answer in step 310 is NO, then the program returns to the beginning to wait for the starting pitch number to be entered. On the other hand, if the answer in step 310 is YES, the program flow proceeds to step 320 where a check is made to determine if the starting diameter for the spring has been entered. If the answer in step 320 is NO, then the program remains in step 320 until a starting diameter is entered. If, on the other hand, the answer in step 320 is YES, the program flow proceeds to step 330. In step 330, a check is made to determine the first instance where the pitch of the spring will be changed. If the answer in step 330 is NO, that is, there will be no changes to the spring pitch, the program flow proceeds to step 331 where a calculation is made to determine the number of feed steps until the spring is finished.

From step 331 the flow proceeds to step 333. In step 333, a calculation is made to determine a feed motor ramp up/ramp down speed function. This function will cause the motor to start out at a slow speed, gradually increase its speed at a constant rate until it peaks in the middle of the spring, and then gradually reduce its speed at a constant rate, until the feed motor speed is zero at the end of the spring. After step 333, the program ends.

On the other hand, if the answer in step 330 had been YES, indicating that there would be a change in the pitch of the spring, then the program flow proceeds to step 332. In step 332, a calculation is made to determine the number of pitch increments needed in order to change from the present spring pitch to the new spring pitch. From step 332 the program flow proceeds to step 334 in which a calculation is made to determine the maximum feed motor speed that will give the correct pitch charge ramp function so that the spring pitch may be changed in the allowed time interval. The program flow proceeds to step 336 where the number of feed steps until the pitch change is calculated. From step 336 the program proceeds to step 338. In step 338, a calculation is made to determine a feed motor ramp up speed function that will increase the feed motor speed at a constant rate so that the feed motor speed is equal to the maximum feed motor speed calculated in step 34 at the point in the spring where the spring pitch is going to be changed.

From step 338, the program flow proceeds to step 340 where a check is made to determine if there is going to be another change in spring pitch. If the answer in step 340 is NO, the program flow proceeds to step 331 and the program flow from this point on has been described above. If, on the other hand, the answer step 340 is YES, the program proceeds to step 342. In step 342, a calculation is made to determine the number of pitch steps required to change from the present spring pitch to the new spring pitch. From step 342, the program flow proceeds to step 344 in which a calculation is made to determine the maximum feed motor speed that will give the correct pitch change ramp function so that the spring pitch may be changed in the allowed time interval. The program flow proceeds to step 346 where the number of feed steps until the pitch change is calculated. From step 346, the program proceeds to step 350. In step 350, a check is made to determine if the number of feed steps calculated in step 346 is greater than a predetermined number of feed steps. That is, step 350 determines if there are enough feed steps to warrant increasing the feed motor speed in order to maximize spring production.

If the answer in step 350 is NO, the program proceeds to step 352. In step 352, the feed motor speed is set to the the maximum motor speed that was calculated in step 344 for the duration of this portion of the spring. From step 352, the program proceeds to step 360. If on the other hand, the answer in step 350 had been YES, then the program proceeds to step 351. In step 351, a calculation is made to determine a feed motor ramp up/ramp down speed function This function will cause the feed motor to start out at the speed that was calculated in step 344, gradually increase its speed at a constant rate until it peaks in the middle of this portion of the spring, and then gradually reduce its speed at a constant rate until the feed motor speed has again returned to the value that was calculated in step 344. From step 351, the program proceeds to step 360.

In step 360, a check is made to determine if there is going to be another change in spring pitch. If the answer in step 360 is YES, the program flow proceeds back to step 342 and continues from there as described above. If on the other hand, the answer to step 360 is NO, the program flow proceeds to step 361. In step 361, a calculation is made to determine a number of feed steps until the spring is finished. From step 361 the program flow proceeds to step 363. In step 363, a calculation is made to determine a feed motor ramp down speed function that will slow the feed motor down at a constant rate so that the feed motor speed is equal to zero at the end of the spring. After step 363, the program ends.

Reference is now made to FIGS. 18A and 18B for a further spring configuration. FIG. 18A illustrates the display diagram of spring configuration. FIG. 18B illustrates the actual physical spring itself. In this connection also refer to table II for an illustration of the significant parameters similar to those previously described in table I but for the spring construction of FIG. 18B.

The particular construction of the spring of FIG. 18B is a tapered spring. However, this has been selected by way of example because it, in addition to having a variable diameter, also involves a pitch tool movement.

Reference is now made to FIG. 18A and the timing diagram illustrating pitch tool movement in curve C1 and diameter tool movement in curve C2. The pitch tool movement is basically to move the pitch tool out to open the pitch, indicated by line 220 in FIG. 18A. At the end of the spring the pitch tool is then moved to its closed position as indicated by the transition or movement line 222 in FIG. 18A The horizontal line 224 in FIG. 18A indicates stationary placement or no movement of the pitch tool. Basically, and in connection with FIG. 18A, the pitch tool is moved not at the very end of the spring but in from the end so that there is at least one closed loop formed at the end of the springs so that the end of the spring is substantially square.

Now, with regard to the diameter tool movement it is noted that the curve C2 is basically comprised of a relatively long term transition line 226 and a relatively short term transition line 228. The line 226 provides the basic control for giving the taper. The line 228 indicates a rapid return to the initial diameter position in readiness for the making of the next spring.

Now, with reference to table II it is noted that, as previously described in connection with table I, there are five columns identified as columns A, B, C, D and E. Column A describes the time interval. Column B indicates the cumulative length of wire in inches. Column C relates to feed steps. Column D relates to pitch steps. Column E relates to diameter steps.

In table II it is noted that initially as the wire is fed the speed increases until the pitch tool commences movement which is at time interval "38". At that time the pitch tool commences movement but the diameter tool has not yet commenced movement. During this relatively short interval when the pitch tool is moving it is noted that the speed of feed stabilizes at about "333". For a short period of time, primarily between interval "47" and interval "54" it is noted that both tools are in motion. Now, after interval "54" only the diameter tool stays in motion at a substantially constant velocity. The pitch tool is no longer moving and because motion is only with one tool rather than with two tools, and because the diameter motion is relatively slow and at a constant velocity, the program enables the feed to increase in speed. This is indicated in column C wherein the feed increase from interval "54" upwardly and actually peaks at interval "129" wherein the feed step is at "951".

It is noted that the diameter tool continues to move at a relatively slow rate changing the diameter to construct the taper but the program anticipates the subsequent pitch tool movement and thus once the peak is reached at interval "129" then there is a ramp down in feed speed to interval "205" wherein the pitch tool now moves in the opposite direction or towards its closed position. The diameter tool also at approximately interval "221" reverses direction and now moves as indicated by line 228 in FIG. 18A back toward its minimum diameter position so that it is back in place ready for the making of a further spring. The pitch tool itself at interval "232" completes its transition back to its closed position and from there the speed simply increases to a peak and then decreases anticipating the completion of the spring. It is noted that during a portion of the pitch tool moving interval the velocity of feed is maintained substantially constant, particularly between interval "220" and interval "233". Now, once the pitch tool ceases motion but the diameter tool is still moving then, as in accordance with the principles of the present invention, the speed of feed can increase and actually peaks at about interval "243" as noted in table II. From there the program anticipates the end of the spring construction and thus the feed from there decreases to zero at the final interval "274".

Figure 19:
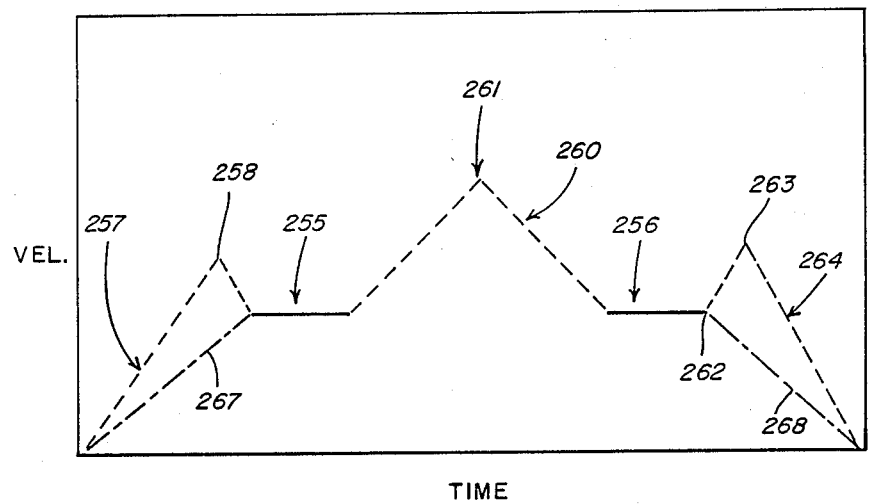
FIG. 19 illustrates a velocity of profile showing pitch tool motion intervals and furthermore illustrating the velocity of speed outside of these intervals.
Figure 20:
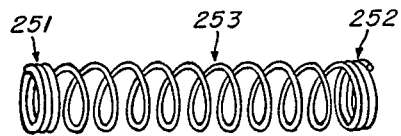
FIG. 20 illustrates the spring construction made in accordance with the velocity profile of FIG. 19.

Reference is also now made herein to FIGS. 19 and 20. FIG. 20 illustrates still a further spring construction which is a relative simply form including end sections 251 and 252 of closed coil form and a center section 253 of open coil form. Assuming the pitch tool wa initially in its closed position which is the normal starting position, there is one pitch tool movement to go out to the open position and then a subsequent reversal of the pitch tool to go back into the closed position to form the final end 252 of the spring. In this connection FIG. 19 illustrates a velocity diagram indicating pitch tool movement at intervals represented by lines 255 and 256. The dotted lines in FIG. 19 represent the velocity waveform at times other than the time that the pitch tool is moving. In this example it is assumed that there is no diameter tool movement.

It is noted in this particular embodiment that initially there is a velocity waveform 257 that has a peak at 258 with a ramp-down following the peak so that the velocity can attain the desired velocity during a tool movement. This is represented by the line 255 in FIG. 19.

After the two have moved out, then for a major portion of spring the speed of production is enhanced in accordance with the present invention by virtue of increasing the feed speed as represented by the curve 260 in FIG. 19 to a peak 261 that is disposed substantially intermediate the lines 255 and 256.

The program of the present invention in essence stores the lines 255 and 256 and their occurrence in the making of the spring and controls what occurs in between by virtue of speeding up the feed but furthermore anticipating the next pitch change so that the speed can thus come down to the level at line 256 so that the proper pitch tool movement can occur in connection with the formation of the last end of the spring.

Once the pitch tool movement has been completed as indicated at point 262 in FIG. 19 then for the remaining end of the spring the velocity can then be increased at curve 264 peaking out at point 263. Again, the formation of the peaks such as peaks 258 and 263 is a function of the length of the end sections. There may be instances in which the end sections are very short in which case there may not be any peak but instead the velocity waveform may simply tail down from the end of a tool movement or tail up at the beginning of a tool movement directly to the velocity desired during the tool movement. This illustrated in FIG. 19 by the alternate lines 267 and 268.

Having now described a limited number of embodiments of the present invention is should now be apparent to those skilled in the art that numerous other embodiments and modifications thereof are contemplated as falling within the scope of the present invention as defined claims.

What is claimed is:

1. A system for controlling the feeding of wire to a workstation for the formation of a coil spring by means of at least one moveable work tool that is disposed at the workstation and that is selectively operated to move to different positions in the formation of a desired spring, said system comprising a feed mechanism for feeding wire to the workstation and control means for controlling the feed mechanism to optimize the rate of spring making, said control means including data entry means for setting the predetermined characteristics regarding wire feed and work tool motion in constructing the desired spring, means for determining, from the entered data, work tool motion intervals, said control means further including;

means for establishing a first predetermined range of velocity of wire feed during a tool motion interval;
means for establishing a second predetermined range of velocity of wire feed outside of said tool motion interval that is greater than the first range of velocity of wire feed;
means for sensing termination of said tool motion interval; and, means responsive to said means for sensing termination of said tool motion interval for changing from said first range to said second range of velocity of wire feed,
whereby wire feed is increased during said second range to enhance speed of spring production.

2. A system as set forth in claim 1 including means for sensing a subsequent work tool movement and increasing the velocity of wire feed over an interval between work tool movements that includes a ramp up in velocity to an intermediate point in the interval followed by a ramp down in velocity.

3. A system as set forth in claim 2 wherein at an intermediate point in the interval the velocity is substantially constant.

4. A system as set forth in claim 2 wherein the coil spring is formed over a forming period and further including means for providing a velocity profile that starts at zero at the beginning of the forming period, increases in velocity until a tool movement is sensed and, at the end of the forming period, decreases in velocity towards zero upon termination of tool movement.

5. A system as set forth in claim 1 wherein said means for establishing said first predetermined range of velocity of wire feed includes means for maintaining the wire feed substantially at a constant velocity.

6. A system as set forth in claim 1 wherein said means for sensing includes means for establishing a maximum operating velocity of wire feed during such work tool movement.

7. A system as set forth in claim 6 wherein the coil spring is formed over a forming period and further including means for providing a velocity profile that starts at zero at the beginning of the forming period, increases in velocity to a peak velocity, and decreases to the maximum operating velocity at commencement of a work tool movement.

8. A system as set forth in claim 7 including means for decreasing the velocity at the end of the forming period and upon termination of a tool movement.

9. A system as set forth claim 1 including two work tools at the workstation and wherein said means for establishing said first predetermined range of velocity of wire feed includes means for maintaining the velocity of wire feed at a first minimum predetermined velocity range when both work tools are in motion.

10. A system as set forth in claim 9 including means for increasing the velocity of wire feed to a second velocity range when only one work tool terminates motion.

11. A system as set forth in claim 10 further including means for increasing the velocity of wire feed to a third predetermined velocity range when both work tools terminate motion.

12. A system as set forth in claim 1 wherein said means for establishing said first predetermined range of velocity of wire feed includes means for continuously varying the velocity of wire feed as a function of the rate of work tool motion.

* * * * *